(12) United States Patent
Honda et al.

(10) Patent No.: US 8,886,233 B2
(45) Date of Patent: Nov. 11, 2014

(54) COMMUNICATION SERVICE MANAGEMENT SYSTEM, SHORT MESSAGE SERVICE MANAGEMENT SYSTEM, COMMUNICATION RELAY APPARATUS, COMMUNICATION SERVICE MANAGEMENT METHOD, AND SHORT MESSAGE SERVICE MANAGEMENT METHOD

(75) Inventors: Yasuyuki Honda, Yokohama (JP);
Shigeru Iwashina, Yokohama (JP);
Nobuo Takeuchi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 167 days.

(21) Appl. No.: 12/992,475

(22) PCT Filed: May 14, 2009

(86) PCT No.: PCT/JP2009/002110
§ 371 (c)(1),
(2), (4) Date: Nov. 12, 2010

(87) PCT Pub. No.: WO2009/139169
PCT Pub. Date: Nov. 19, 2009

(65) Prior Publication Data
US 2011/0070903 A1 Mar. 24, 2011

(30) Foreign Application Priority Data
May 15, 2008 (JP) .................................. 2008-128588

(51) Int. Cl.
*H04W 4/14* (2009.01)
*H04W 4/12* (2009.01)
*H04W 76/02* (2009.01)

(52) U.S. Cl.
CPC . *H04W 4/12* (2013.01); *H04W 4/14* (2013.01); *H04W 76/022* (2013.01)
USPC .......................................... 455/466; 370/352

(58) Field of Classification Search
CPC .......................... H04W 28/24; H04W 28/0268
USPC .......................................... 455/466; 370/352
See application file for complete search history.

(56) References Cited

U.S. PATENT DOCUMENTS 6,307,837 B1 * 10/2001 Ichikawa et al. ............... 370/230
6,950,876 B2 * 9/2005 Bright et al. .................. 709/230

(Continued)

FOREIGN PATENT DOCUMENTS

| JP | 2004-253867 A | 9/2004 |
| JP | 2005-191880 A | 7/2005 |
| JP | 2006-109110 A | 4/2006 |

OTHER PUBLICATIONS

PCT/JP2009/002110 PCT/ISA/210.

(Continued)

*Primary Examiner* — Qun Shen
(74) *Attorney, Agent, or Firm* — Crowell & Moring LLP

(57) ABSTRACT

It is made possible to accurately perform connection determination of whether the line connection satisfies a predetermined connection permission condition in a communication service for transmitting data in a store-and-forward system from a network, in which a calling terminal device is located, to a network, in which a receiving terminal device is located, through one or more communication relay apparatuses of another network and a provider. For this end, in a procedure of transmitting the data in the store-and-forward system from a network (source network) N11, in which a calling terminal device MS1 is located, to a network (destination network) N13, in which a receiving terminal device MS2 is located, through one or more communication relay apparatuses PF11 and PF12 of another network N12 and providers P11 and P12, address information in the source network N11 is maintained without being overwritten, so that the connection determination in the destination network N13 is accurately performed.

12 Claims, 18 Drawing Sheets

(56) References Cited

U.S. PATENT DOCUMENTS

| | | | |
|---|---|---|---|
| 7,876,766 B1* | 1/2011 | Atkins et al. | 370/401 |
| 2001/0003094 A1* | 6/2001 | Foll | 455/466 |
| 2004/0180678 A1 | 9/2004 | Smith et al. | |
| 2005/0143076 A1 | 6/2005 | Machida et al. | |
| 2006/0135184 A1* | 6/2006 | Schmidt et al. | 455/466 |
| 2007/0286163 A1 | 12/2007 | Oka et al. | |
| 2008/0200192 A1* | 8/2008 | Harris | 455/466 |
| 2009/0103520 A1* | 4/2009 | Begall et al. | 370/352 |

OTHER PUBLICATIONS

PCT/JP2009/002110 PCT/IB/338.
PCT/JP2009/002110 PCT/IB/373.
PCT/JP2009/002110 PCT/ISA/237 (Translation).
Chinese Office Action w/Translatlon, dated Oct. 9, 2012, 24 pages total.
Chinese Office Action dated Mar. 21, 2013 (three (3) pages), w/English translation (six (6) pages).

* cited by examiner

F I G. 3
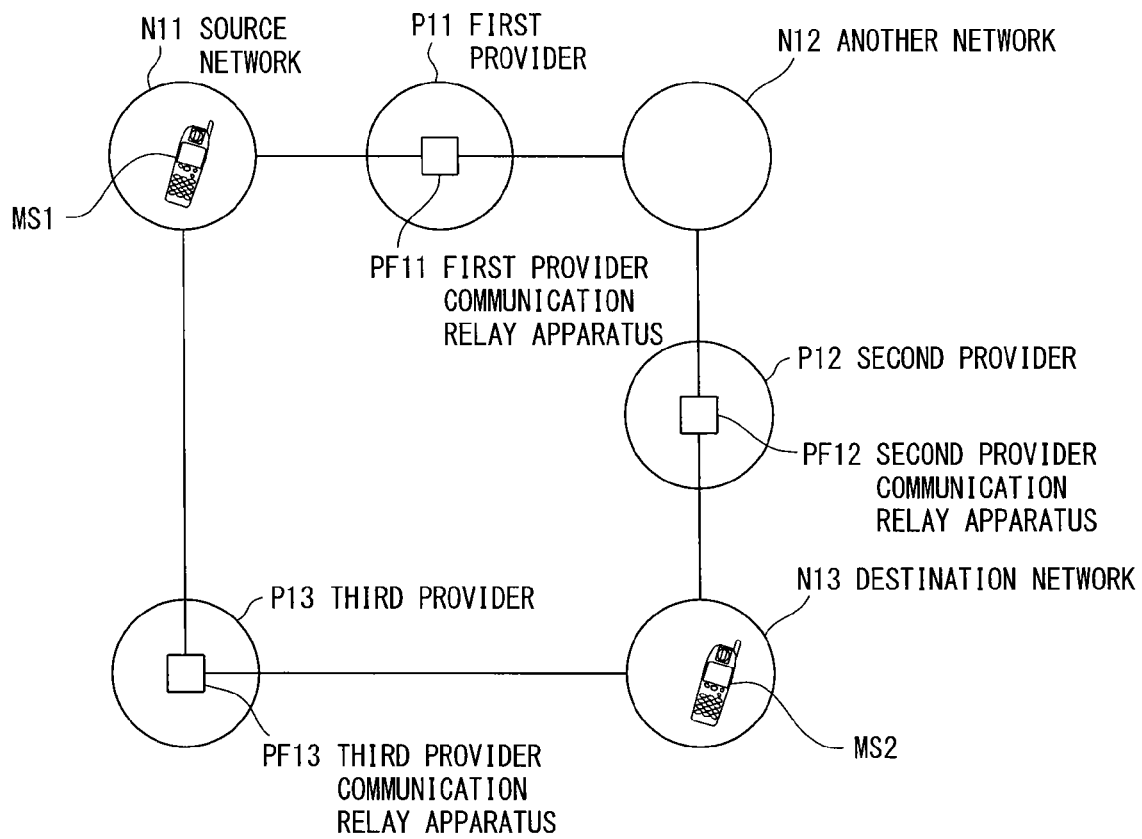

COMMUNICATION SERVICE MANAGEMENT SYSTEM, SHORT MESSAGE SERVICE MANAGEMENT SYSTEM, COMMUNICATION RELAY APPARATUS, COMMUNICATION SERVICE MANAGEMENT METHOD, AND SHORT MESSAGE SERVICE MANAGEMENT METHOD

TECHNICAL FIELD

The present invention relates to a management system for carrying out a communication service for transmitting data in a store-and-forward system from a calling terminal device in a source network, which is a network where the calling terminal device is located, to a receiving terminal device in a destination network, which is a network where the receiving terminal device is located, through one or more communication relay apparatuses of other networks and providers. The present invention also relates to a management system, in which the communication service is particularly carried out as a short message service, the communication relay apparatuses in such a management system, and a management method in each management system.

BACKGROUND ART

A communication service for transmitting data of a text message in a store-and-forward system from a calling terminal device in a source network, which is a network where the calling terminal device is located, to a receiving terminal device in a destination network, which is a network where the receiving terminal device is located, through one or more communication relay apparatuses of other networks and providers is already carried out in multiple countries as one of known communication services called, for example, short message service.

Primarily, in such an existing short message service, the connection of a line is permitted in a case where a communication carrier of a subscriber on the calling side and a communication carrier of a subscriber on the receiving side have made agreements. In a case where they have not made agreements, it is necessary to determine the acceptability of the connection and to control the connection not to be permitted.

There has been proposed a technique for determining the acceptability of connection and controlling the connection according to the result of the determination similar to the technique described above as a technique for determining the suitability of the connection of a telephone call, particularly in relation to whether or not the subscriber can be appropriately charged (for example, see Patent Document 1).

In the proposal described in Patent Document 1, when a call response signal transmitted from a destination network is received in a connection procedure of a telephone call, a selected relay carrier checks whether the communication carrier of the destination network is registered in an carrier information list for receiving calls, including the communication carriers of the destination network that have made agreements with the selected relay carrier, based on the carrier information for receiving calls for identifying the communication carrier of the destination network included in the call response signal. The selected relay carrier denies the connection if the carrier is not registered, but allows the connection if the carrier is registered.

The proposal described in Patent Document 1 is not a technique particularly provided for a short message service. Meanwhile, there has already been proposed a technique for handling a problem in the determination of the acceptability of connection in the short message service.

More specifically, there have been proposed an interconnection contract determination system and an apparatus such that in a case where a calling terminal and a receiving terminal subscribe to different carriers (communication carriers), and only in a case where the different carriers have made a short message service interconnection contract, short messages can be transferred between the calling terminal and the receiving terminal (for example, see Patent Document 2).

The proposal of Patent Document 2 discloses the necessity of control in which a mobile switching center located in an area that has received a forward request of a short message from a calling terminal determines the presence of an SMS (Short Message Service) interconnection contract between the contract carriers of the calling terminal and the receiving terminal. The mobile switching center forwards the received short message to a short message distribution center (SMSC: Short Message Service Center) only when is the presence of such a contract is confirmed. Furthermore, in order to perform the above control in a appropriate manner, in the disclosure, the mobile switching center in the area, determines whether the contract carrier of the receiving communication terminal has signed an interconnection contract with the carrier of the source network based on information of an SMS interconnection contract carrier list held in advance by the mobile switching center in the area as a technical level already at the proposal.

Particularly, in the proposal of Patent Document 2, the mobile switching center in the area is allowed to determine in an accurate fashion the carrier subscribed by the receiving communication terminal based on subscriber identification information even if the telephone number of the receiving communication terminal is not changed by number portability. In the disclosure, the determination of the short message service interconnection contract can be accurately performed based on the accurately determined carrier.

PRIOR ART DOCUMENTS

Patent Documents

Patent Document 1: JP 2004-253867A (paragraphs 0004 to 0008 and the like)
Patent Document 2: JP 2005-191880A (paragraphs 0002 to 0009, 0015 to 0016, and the like)

SUMMARY OF THE INVENTION

Problems to be Solved by the Invention

However, in the existing short message services, there has been no technique established for allowing accurate connection determination, even if data is transmitted from a calling terminal device in a source network, which is a network where the calling terminal device is located, to a receiving terminal device in a destination network, which is a network where the receiving terminal device is located, through one or more communication relay apparatuses of other networks and providers.

In the techniques described in Patent Documents, no proposal has been made for allowing accurate connection determination under conditions in which one or more relay apparatuses of other networks and provides are intervened in the transmission route of data, as a technical problem. Obviously, a method of solving such a technical problem has not been proposed yet.

Therefore, in the proposed techniques, accurate connection determination cannot be assured under conditions in which one or more communication relay apparatuses of other networks and providers are intervened. As a result, connection may be established accordingly even if a regular interconnection contract is not signed.

The present invention has been made in view of the circumstances, and an object is to provide a communication service management system, a short message service management system, a communication relay apparatus, a communication service management method, and a short message service management method capable of accurate connection determination of whether the connection concerning a communication service satisfies a predetermined connection permission condition in relation to the communication service for transmitting data in a store-and-forward system from a calling terminal device in a source network, which is a network where the calling terminal device is located, to a receiving terminal device in a destination network, which is a network where the receiving terminal device is located, through one or more communication relay apparatuses of other networks and providers.

Means for Solving the Problems

To solve the problems, the present description proposes the following system, apparatus, and method.

There is provided a communication service management system carrying out a communication service for transmitting data in a store-and-forward system from a calling terminal device in a source network in which the calling terminal device is located to a receiving terminal device in a destination network in which the receiving terminal device is located through one or a plurality of communication relay apparatuses of another network and a provider, the communication relay apparatus of said another network and the provider carrying out data transmission comprising:

an address information storage unit for storing source network address information when the address information indicating the source network of the calling terminal device attached to the data to be relayed is stored;

a connection determination request unit for requesting a communication carrier of the destination network for connection determination on whether a connection of the communication service satisfies a predetermined connection permission condition; and a connection control unit for controlling the connection of the communication service when a result of the connection determination is positive.

The communication service management system described in the above manages connection of the transmission in a communication service for transmitting data by a store-and-forward system from a calling terminal device in a source network, which is a network where the calling terminal device is located, to a receiving terminal device in a destination network, which is a network where the receiving terminal device is located, through one or a plurality of communication relay apparatuses of another network and provider.

The communication relay apparatus of the another network and the provider carrying out the transmission of data in the communication service management system comprises address information storage means, and when address information indicating the source network of the calling terminal device attached to the data to be relayed is stored, the address information storage means stores the address information.

Furthermore, by connection determination request means, the communication relay apparatus of the another network and the provider carrying out the transmission of data requests a communication carrier of the destination network for connection determination of whether the connection of the communication service satisfies a predetermined connection permission condition.

Furthermore, connection control means establishes connection of the communication service when a result of the connection determination is positive.

In the above communication service management system the address information storage unit in the communication relay apparatus stores data in a format including a pair of a message section composed of data indicating the data to be relayed and a source address section composed of a source network address indicating the source network and being associated with the data of the message section, in a message box of applied storage unit.

In the above communication service management system, particularly in the communication service management system, the address information storage means in the communication relay apparatus executes a process of storing data in a format including a pair of a message section composed of data indicating the data to be relayed and source address section composed of an address indicating the source network associated with the data of the message section, in a message box of applied storage means.

In the above communication service management system, a transmission frame including a data field including source network address data of the source address section is applied to the data transmission.

In the above communication service management system, the transmission frame including the data field including address data of the source address section is applied to the transmission of data.

There is provided a short message service management system carrying out a short message service for transmitting a short message from a calling terminal device in a source network, in which the calling terminal device is located to a receiving terminal device in a destination network, in which the receiving terminal device is located, through one or a plurality of communication relay apparatuses of another network and a provider, the communication relay apparatus of said another network and the provider carrying out data transmission of short message comprises address information storage means for storing address information when the address information indicating the source network of the calling terminal device attached to the short message to be relayed is stored, and the communication relay apparatus of the remote network and the providers carrying out data transmission comprises connection determination request means for requesting a communication carrier of the destination network for connection determination of whether the connection of the short message service satisfies a predetermined connection permission condition and connection control means for controlling the connection of the short message service when a result of the connection determination is positive.

The above short message service management system manages the connection of the transmission in a short message service in a destination network, which is a network where a receiving terminal device is located, from a calling terminal device in a source network, which is a network where the calling terminal device is located, through one or a plurality of communication relay apparatuses of another network and a provider.

The communication relay apparatus comprises address information storage means, and when address information indicating the source network of the calling terminal device attached to the short message to be relayed is stored, the address information storage means stores the address information.

Furthermore, by connection determination request means, the communication relay apparatus of another network and the provider carrying out the transmission of short message requests a communication carrier of the destination network for connection determination of whether the connection of the communication service satisfies a predetermined connection permission condition.

Furthermore, connection control means establishes connection of the communication service when a result of the connection determination is positive.

In above the short message service management system, the address information storage means in the communication relay apparatus executes a process of storing data in a format including a pair of a message section composed of data indicating the data to be relayed and a source address section composed of addresses indicating the source network associated with the data of the message section, in a message box of applied storage means.

In the above short message service management system, the address information storage means in the communication relay apparatus executes a process of storing data, in a format including a pair of a message section composed of data indicating the data to be relayed and a source address section composed of an address indicating the source network associated with the data of the message sections, in a message box of applied storage means.

In the above short message service management system, a transmission frame including a data field including address data of the source address section is applied to the transmission of data.

In the above short message service management system, the transmission frame including the data field including address data of the source address section is applied to the transmission of data.

There is provided a communication relay apparatus applied to a communication service management system carrying out a communication service for transmitting data in a store-and-forward system from a calling terminal device in a source network, in which is a network where the calling terminal device is located, to a receiving terminal device in a destination network, in which the receiving terminal device is located, through one or a plurality of communication relay apparatuses of another network and a provider, the communication relay apparatus comprising:

address information accumulation means for accumulating address information indicating the source network of the calling terminal device attached to the data to be relayed; and address information storage means for storing the address information of the calling terminal device accumulated in the address information accumulation means.

The above communication relay apparatus described is applied to a communication service management system carrying out a communication service for transmitting data in a store-and-forward system from a calling terminal device in a source network, which is a network where the calling terminal device is located, to a receiving terminal device in a destination network, which is a network where the receiving terminal device is located, through one or a plurality of communication relay apparatuses of another network and a provider.

Furthermore, the address information accumulation means accumulates address information indicating the source network of the calling terminal device attached to the data to be relayed.

When the address information indicating the source network of the calling terminal device attached to the short message to be relayed is stored on the address information storage means, the address information storage means stores the address information.

In the above communication relay apparatus, the address information storage means executes a process of storing data in a format including a pair of a message section composed of data indicating the data to be relayed and a source address section composed of an address indicating the source network associated with the data of the message section, in a message box of applied storage means.

In the above communication relay apparatus, the address information storage means executes a process of storing data in a format including a pair of a message section composed of data indicating the data to be relayed and a source address section composed of an address indicating the source network associated with the data of the message section, in a message box of applied storage means.

In the above communication relay apparatus, a transmission frame including a data field including address data of the source address section is applied to the transmission of data.

In the above communication relay apparatus, the transmission frame including the data field including address data of the source address sections is applied to the transmission of data.

There is provided a communication relay apparatus applied to a communication short message service management system carrying out a short message service for transmitting a short message from a calling terminal device in a source network, in which the calling terminal device is located, to a receiving terminal device in a destination network, in which the receiving terminal device is located, through one or a plurality of communication relay apparatuses of another network and a provider, the communication relay apparatus comprising:

address information accumulation means for accumulating address information indicating the source network of the calling terminal device attached to the short message to be relayed; and address information storage means for storing the address information of the calling terminal device accumulated in the address information accumulation means.

The above communication relay apparatus is applied to a communication service management system of a communication service for transmitting data in a store-and-forward system from a calling terminal device in a source network, which is a network where the calling terminal device is located, to a receiving terminal device in a destination network, which is a network where the receiving terminal device is located, through one or a plurality of communication relay apparatuses of another network and a provider.

Furthermore, the address information accumulation means accumulates address information indicating the source network of the calling terminal device attached to the data to be relayed.

When the address information indicating the source network of the calling terminal device attached to the short message to be relayed is stored in the address information storage means, the address information storage means stores the address information.

In the above communication relay apparatus, the address information storage means executes a process of storing data in a format including a pair of a message section composed of data indicating the data to be relayed and a source address section composed of an address indicating the source network associated with the data of the message sections, in a message box of applied storage means.

In the above communication relay apparatus, the address information storage means executes a process of storing data, in a format including a pair of a message section composed of data indicating the data to be relayed and a source address section composed of an address indicating the source network associated with the data of the message section, in a message box of applied storage means.

In the above communication relay apparatus, a transmission frame including a data field including address data of the source address section is applied to the transmission of data.

There is provided a communication service management method carrying out a communication service for transmitting data in a store-and-forward system from a calling terminal device in a source network, in which the calling terminal device is located, to a receiving terminal device in a destination network, in which the receiving terminal device is located, through one or a plurality of communication relay apparatuses of another network and a provider, the communication service management method comprising:

storing address information indicating the source network of the calling terminal device in the source network in the communication relay apparatus of said another network and the provider carrying out data transmission;

requesting, from the provider, a communication carrier of the destination network for connection determination of whether the connection of the communication service satisfies a predetermined connection permission condition; and performing the connection of the communication service when a result of the connection determination is positive.

The above communication service management method is a management method of the connection of the transmission in a communication service for transmitting data in a store-and-forward system from a calling terminal device in a source network, which is a network where the calling terminal device is located, to a receiving terminal device in a destination network, which is a network where the receiving terminal device is located, through one or a plurality of communication relay apparatuses of another network and a provider.

The address information indicating the source network of the calling terminal device in the source network is held in the communication relay apparatus of another network and the provider carrying out the transmission of data, the communication carrier of the destination network is requested from the provider for connection determination of whether the connection of the communication service satisfies a predetermined connection permission condition, and the connection of the communication service is performed when a result of the connection determination is positive. Therefore, even if one or a plurality of communication relay apparatuses of a remote network and providers exist between a source network and a destination network, accurate connection determination and connection control corresponding to the determination can be performed.

In the above communication service management method, in case that the address information is stored, executing a process of storing data in a format including a pair of a message section composed of data indicating the data to be relayed and a source address section composed of an address indicating the source network associated with the data of the message section, in a message box of applied storage means.

In the above communication service management method, a process of storing data is executed in storing the address information, in a format including a pair of a message section composed of data indicating the data to be relayed and a source address section composed of an address indicating the source network associated with the data of the message section, in a message box of applied storage means.

In the above communication service management method, a transmission frame including a data field including address data of the source address section is applied to the transmission of data.

In the above communication service management method, the transmission frame including the data field including address data of the source address section is applied to the transmission of data.

There is provided a short message service management method of carrying out a short message service for transmitting a short message from a calling terminal device in a source network, which is a network where the calling terminal device is located, to a receiving terminal device in a destination network, which is a network where the receiving terminal device is located, through one or a plurality of communication relay apparatuses of another network and a provider, the short message service management method comprising:

storing address information indicating the source network of the calling terminal device in the source network in the communication relay apparatus of said another network and the provider carrying out data transmission of the short message;

requesting, from the provider, a communication carrier of the destination network for connection determination of whether the connection of the short message service satisfies a predetermined connection permission condition; and performing the connection of the short message service when a result of the connection determination is positive.

The above short message service management method is a management method of the connection of the transmission in a short message service for transmitting a short message in a store-and-forward system from a calling terminal device in a source network, which is a network where the calling terminal device is located, to a receiving terminal device in a destination network, which is a network where the receiving terminal device is located, through one or a plurality of communication relay apparatuses of another network and a provider.

The address information indicating the source network of the calling terminal device in the source network is stored in the communication relay apparatus of another network and the a provider carrying out the transmission of the short message, the communication carrier of the destination network is requested from the provider for connection determination of whether the connection of the short message service satisfies a predetermined connection permission condition, and the connection of the short message service is performed when a result of the connection determination is positive. Therefore, even if one or a plurality of communication relay apparatuses of another network and a provider exist between a source network and a destination network, it is made possible to perform accurate connection determination and connection control corresponding to the determination.

In the above short message service management, in case that the address information is stored, executing a process of storing data in a format including a pair of a message section composed of data indicating the data to be relayed and a source address section composed of an address indicating the source network associated with the data of the message section, in a message box of applied storage means.

In the above short message service management method, a process of storing data is executed in storing the address information, in a format including a pair of a message section composed of data indicating the data to be relayed and a source address section composed of an address indicating the source network associated with the data of the message sections, in a message box of applied storage means.

In above the short message service management method, a transmission frame including a data field including address data of the source address section is applied to the transmission of data.

In the above short message service management method, the transmission frame including the data field including address data of the source address section is applied to the transmission of data.

Advantage of the Invention

According to the present invention, it is made possible to achieve a communication service management system, a short message service management system, a communication relay apparatus, a communication service management method, and a short message service management method, whereby allowing the accurate connection determination of whether connection concerning a communication service satisfies a predetermined connection permission condition in relation to the communication service of transmitting data in a store-and-forward system from a calling terminal device in a source network, which is a network where the calling terminal device is located, to a receiving terminal device in a destination network, which is a network where the receiving terminal device is located, through one or a plurality of communication relay apparatuses of another network and a provider.

BRIEF DESCRIPTION OF THE DRAWINGS

FIG. 3 is a conceptual diagram showing a summary of the communication service management system according to another aspect of the present invention;

MODE FOR CARRYING OUT THE INVENTION

Figure 1:
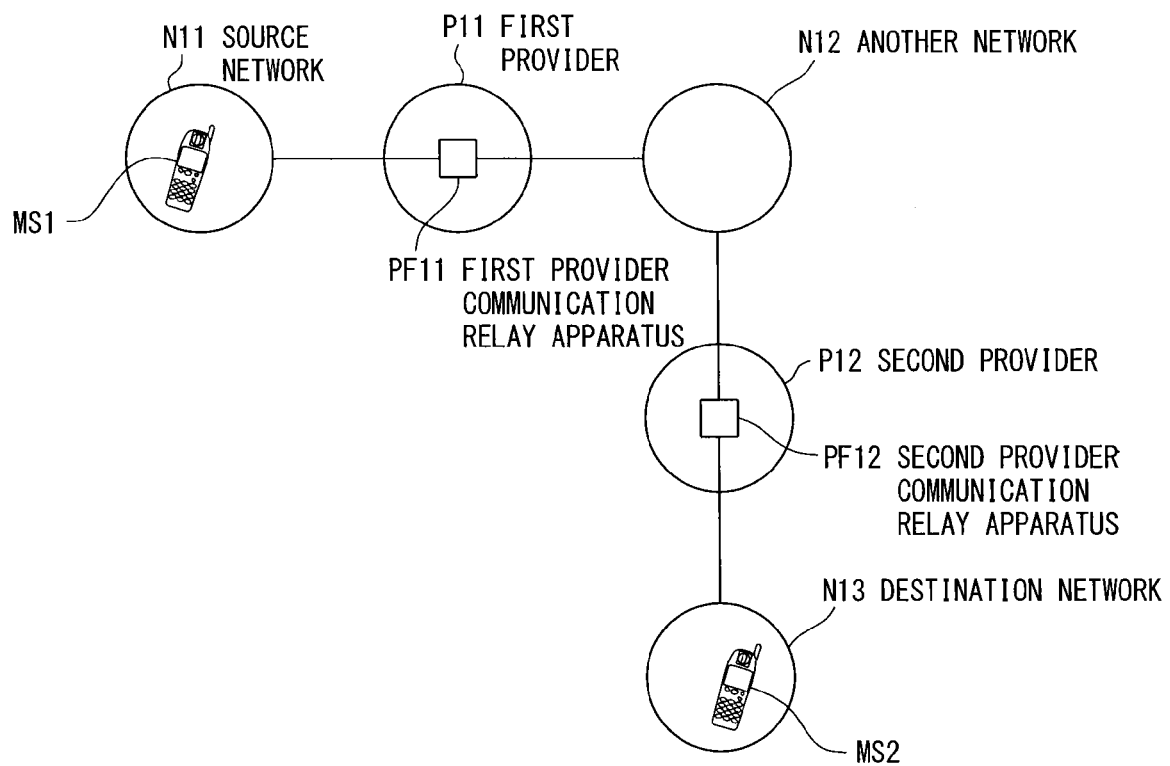
FIG. 1 is a conceptual diagram showing a summary of a communication service management system according to an aspect of the present invention.

Hereinafter, the present invention will be made clear by describing embodiments of the present invention in detail with reference to the drawings. In the drawings referenced below, main parts as a theme of the description will be appropriately emphasized, whereas the parts other than the main parts are appropriately simplified or omitted for convenience.

FIG. 1 is a conceptual diagram showing a summary of a communication service management system according to an aspect of the present invention.

In the communication service management system of FIG. 1, data is transmitted in a store-and-forward system from a source network N11 (where a calling terminal device MS1 is located in the illustrated example) to a destination network N13 (where a receiving terminal device MS2 is located in the illustrated example). In the transmission, before data (short message in the case of short message service) subject to transmission is transmitted, it is determined whether interconnection is permitted through a route of the source network N11->a first provider P11 (a communication relay apparatus PF11 thereof)->another network N12->a second provider P12 (a communication relay apparatus PF12 thereof)->the destination network N13.

Here, the transmission of data in the store-and-forward system typically corresponds to transmission of a short message in a short message service. However, under the concept of the present invention, there is no need to limit the data subject to transmission to the short message.

In the examples described below, it is assumed that the first provider P11 is a so-called SMS (Short Message Service) provider that establishes interconnection for the short message service between communication carriers and that the second provider P12 is, for example, a so-called SIMN (Simple Imsi Multiple Number: a plurality of numbers are used in a single line) provider and is a provider that converts telephone numbers between communication carriers.

The first provider P11 (the communication relay apparatus PF thereof) and the second provider P12 (the communication relay apparatus PF12 thereof) in the communication service management system include address information storage means to be described below.

When address information indicating the source network of the calling terminal device MS1 attached to the data (for example, a short message) to be relayed is stored, the address information retention means stores the address information.

In the example of FIG. 1, in one of the communication relay apparatus PF of another network N12 and the first provider P11 and the communication relay apparatus PF12 of the second provider P12 (described below), connection determination request means further requests the communication carrier of the destination network N13 for connection determination of whether the connection of the communication service of FIG. 1 satisfies a predetermined connection permission condition.

Connection control means (described below) is further provided, and the connection control means establishes connection of the communication service when the result of the connection determination is positive.

The connection determination and the connection control will be further described in detail with reference also to FIG. 2.

In the example of FIG. 1 and the examples described below, the address information is stored based on methods illustrated below, and it can be summarized that means for storing the address information based on the methods universally functions as the address information storage means.

More specifically, a first example is a method in which the content of the address information is maintained every time information is stored in the transmission procedure of short messages, and overwriting of the address information is prohibited. A second example is a method of transmission in a form of extending the data structure applied in the transmission procedure of short massages, specially setting up an area in which overwriting of content is prohibited, and accommodating the address information in the area.

Figure 2:
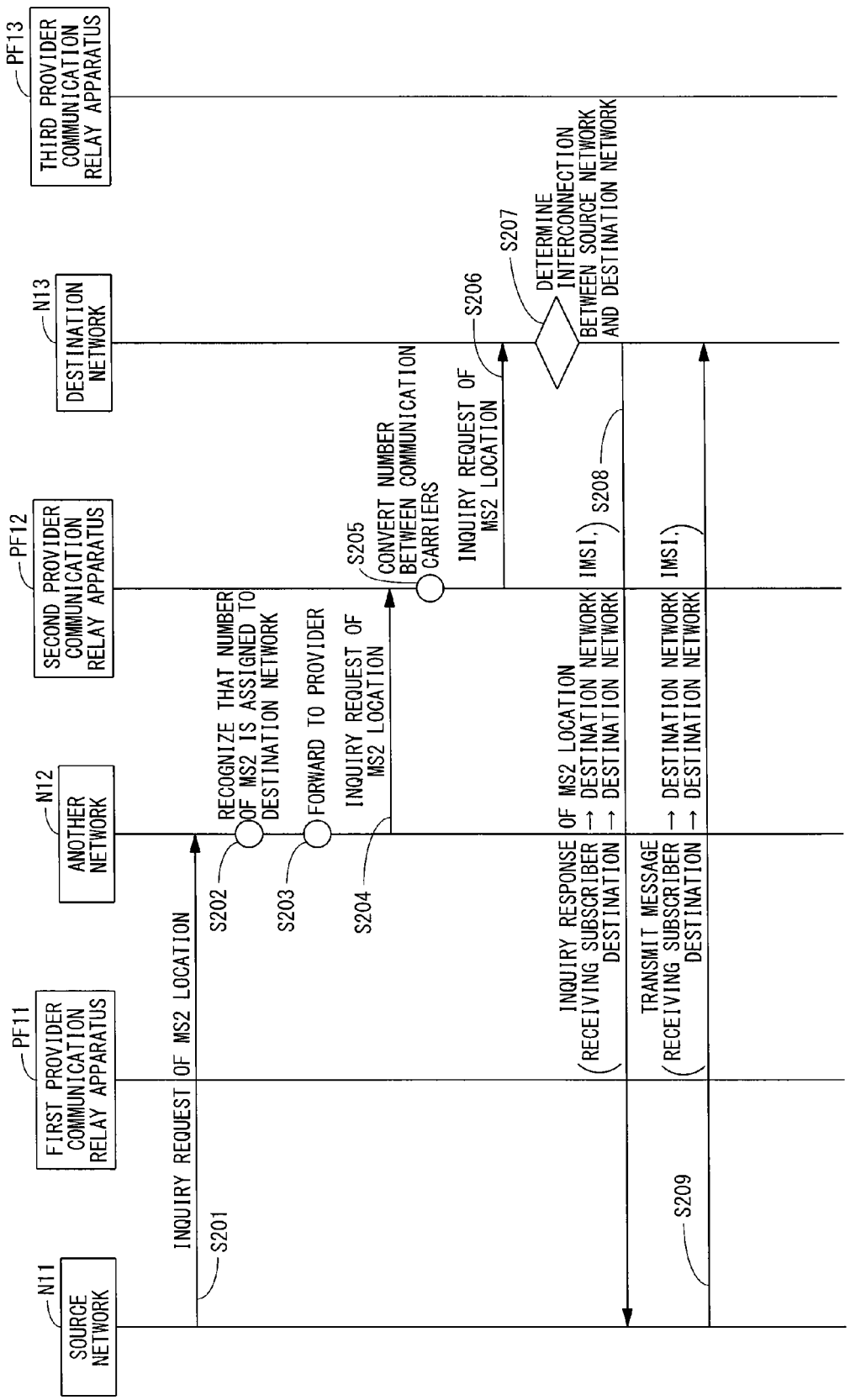
FIG. 2 is a sequence chart showing an operation of the communication service management system in the case of FIG. 1.

FIG. 2 is a sequence chart showing an operation of the communication service management system in the case of FIG. 1.

In the case of FIG. 2, connection between the source network N11 and the destination network N13 is established through the first provider P11 (the communication relay apparatus PF11 thereof) and the second provider P12 (the communication relay apparatus PF12 thereof). The connection determination is performed such that the source network N11 executes a location inquiry of existence in the network before the transmission of data (short message in the case of short message service) subject to transmission.

FIG. 2 also illustrates a case in which connection between the source network N11 and the destination network N13 is permitted.

A third provider communication relay apparatus PF 13 is illustrated in FIG. 2 for comparison with another example described later, but is not used in the example described with reference to FIG. 1 and FIG. 2.

Next, the communication service management system of the present invention will be described further with reference to FIG. 1 and FIG. 2, as necessary.

In the transmission of a message from the calling terminal device MS1 to the receiving terminal device MS2, the source network N11 issues an inquiry request of inquiring the location of the receiving terminal device MS2 to another network N12 (step S201).

Once another network N12 that has received the inquiry request in step S201 checks that the telephone number of the receiving terminal device MS2 subject to the inquiry request is assigned to the destination network N13 (step S202), another network N12 forwards the inquiry request to the second provider P12 (the communication relay apparatus PF12 thereof) (step S203->step S204).

As described, in the present example, it is assumed that the second provider P12 (the communication relay apparatus PF12 thereof) that has received the inquiry request in step S204 is a provider that converts telephone numbers between communication carriers. Therefore, the second provider P12 performs incoming call number conversion (step S205) and issues a inquiry request to the destination network N13 (step S206).

The inquiry request in steps S201, S204, and S206 include connection determination requests for requesting the communication carrier of the destination network N13 to perform connection determination of whether the connection of the communication service FIG. 1 satisfies a predetermined connection permission condition.

More specifically, the source network N11, another network N12, and the second provider (the communication relay apparatus PF12 thereof) each comprise connection determination request means (not shown) for requesting to perform the connection determination.

In an embodiment of the present invention, the information (number) indicating the communication carrier of the source network N11 that is the initial transmission source of the calling side is maintained in the procedure of steps S201 to S206.

This is maintained by including a request for maintaining the information (number) indicating the communication carrier of the source network N11 in the transmission of information in steps S201 and S204 and the address information storage means for storing the information (number) indicating the communication carrier of the source network N11 is included in each of another network N12 and the second provider P12.

Therefore, the destination network N13 that has received the inquiry request of step S206 is capable of accurately recognizing the communication carrier of the source network N11 from the maintained number.

Before the recognition, the destination network N13 executes interconnection determination of whether the connection between the source network N11 and the destination network N13 is the connection satisfying a predetermined connection permission condition, such as the communication carriers of both networks having signed regular agreements (step S207).

In the example illustrated in FIG. 2, it is assumed that a positive determination result is obtained in the interconnection determination of step S207 concerning whether the connection of the communication service between the source network N11 and the destination network N13 satisfies the predetermined connection permission condition.

Therefore, in response to the inquiry request of step S201, the destination network N13 makes a location inquiry response to the source network N11 (step S208).

The location inquiry response of step S208 retains IMSI (International Mobile Subscriber Identity) indicating that the receiving terminal device MS2 is under the management of the destination network N13 and includes information indicating that the destination of the communication message is the destination network N13.

The source network N11 that has received the location inquiry response of step S208 transmits data (short message in the case of short message service) subject to transmission in the communication service management system to the destination network N13 (step S209).

The information transmitted in step S209 includes information indicating that the receiving terminal device MS2 is the IMSI of the destination network N13 and that the destination of the communication message is the destination network N13.

Through the procedure of steps S201 to S209, the data (short message in the case of short message service) subject to transmission is transmitted from the calling terminal device MS1 to the receiving terminal device MS2 by regular connection in the communication service management system.

FIG. 3 is a conceptual diagram showing a summary of the communication service management system according to another aspect of the present invention.

In FIG. 3, the parts corresponding to already-described FIG. 1 are shown with the same reference numerals.

In the communication service management system of FIG. 3, data is also transmitted in the store-and-forward system from the calling terminal device MS1 (the source network N11 where the device is located) to the receiving terminal device MS2 (the destination network N13 where the device is located). In the transmission, before the transmission of data (short message in the case of short message service) subject to transmission, it is determined whether interconnection is permitted through a route of the source network N11->the first provider P11 (the communication relay apparatus PF11 thereof)->another network N12->the second provider P12 (the communication relay apparatus PF12 thereof)->the destination network N13.

Here, the transmission of data in the store-and-forward system typically corresponds to transmission of a short message in a short message service. However, under the concept of the present invention, there is no need to limit the data subject to transmission to the short message.

In the configuration of the communication service management system, the difference from already-described FIG. 1 is that the data (short message in the case of short message service) subject to transmission is transmitted from the calling terminal device MS1 to the receiving terminal device MS2 through the third provider P13 (communication relay apparatus PF13 thereof).

In the communication service management system of FIG. 3, the communication relay apparatus PF11 of another network N12, the first provider P11, and the communication relay apparatus PF12 of the second provider P12 each include address information storage means to be described later. When the address information indicating the source network of the calling terminal device MS1 attached to the data (for example, short message) to be relayed is stored, the address information storage means stores the address information.

As in the example of FIG. 1, in one of the communication relay apparatus PF11 of another network N12 and the first provider P11 as well as the communication relay apparatus PF12 of the second provider P12, the connection determination request means requests the communication carrier of the destination network N13 for connection determination of whether the connection of the communication service of FIG. 1 satisfies a predetermined connection permission condition.

Figure 4:
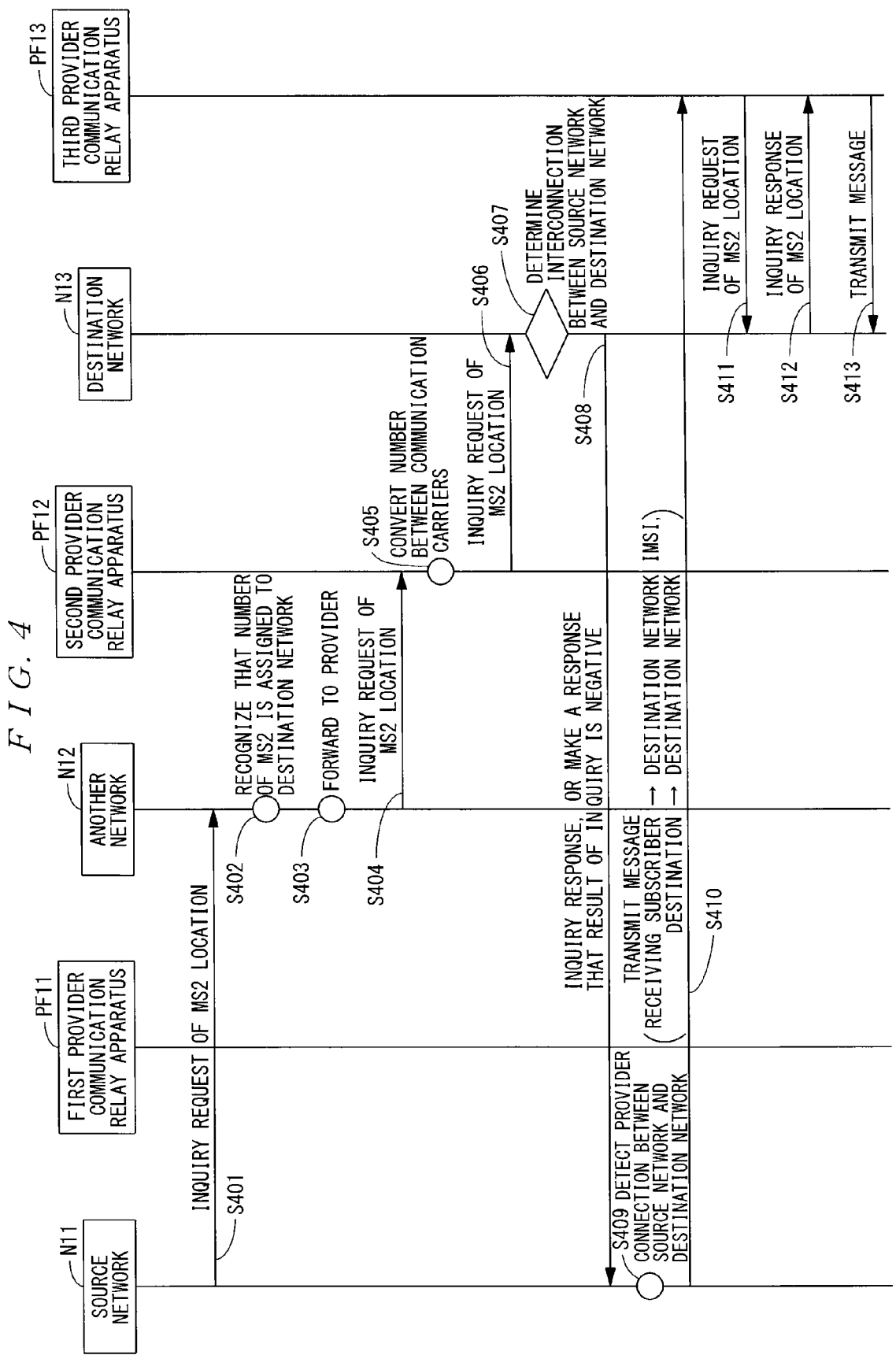
FIG. 4 is a sequence chart showing an operation of the communication service management system in the case of FIG. 3.

FIG. 4 is a sequence chart showing an operation of the communication service management system in the case of FIG. 3.

Also in FIG. 4, connection between the source network N11 and the destination network N13 is also established through the first provider P11 (the communication relay apparatus PF11 thereof) and the second provider P12 (the communication relay apparatus PF12 thereof). The connection determination is performed such that the source network N11 executes a location inquiry before the transmission of data (short message in the case of short message service) subject to transmission.

However, in FIG. 4, the connection between the source network N11 and the destination network N13 is established through the third provider P13 (the communication relay apparatus PF13 thereof).

Next, the communication service management system of the present invention will be further described with reference to FIG. 3 and FIG. 4, as necessary.

In the transmission of a message from the calling terminal device MS1 to the receiving terminal device MS2, the source network N11 issues a inquiry request of the receiving terminal device MS2 to another network N12 (step S401).

Once another network N12 that has received the inquiry request in step S401 checks that the telephone number of the receiving terminal device MS2 subject to the inquiry request is assigned to the destination network N13 (S402), another network N12 forwards the inquiry request to the second provider P12 (the communication relay apparatus PF12 thereof) (step S403->step S404).

As described, it is assumed that the second provider P12 (the communication relay apparatus PF12 thereof) that has received the inquiry request in step S404 is, for example, a so-called SIMN provider. Therefore, the second provider P12 performs incoming call number conversion (step S403) and issues a inquiry request to the destination network N13 (step S406).

The inquiry requests in steps S401, S404, and S406 include connection determination requests for requesting the communication carrier of the destination network N13 to perform connection determination of whether the connection of the communication service of FIG. 1 satisfies a predetermined connection permission condition.

More specifically, the source network N11, another network N12, and the second provider (the communication relay apparatus PF12 thereof) each comprise connection determination request means (not shown) for requesting to perform the connection determination.

In the present embodiment, the information (number) indicating the communication carrier of the source network N11 that is the initial transmission source of the calling side is maintained in the procedure of steps S401 to S406.

This is maintained by including a request for maintaining the information (number) indicating the communication carrier of the source network N11 in the transmission of information in steps S401 and S404 and the address information storage means for storing the information (number) indicating the communication carrier of the source network N11 is included in each of another network N12 and the second provider P12.

Therefore, the destination network N13 that has received the inquiry request of step S406 is capable of accurately recognizing the communication carrier of the source network N11 from the maintained number.

Based on the recognition, the destination network N13 executes interconnection determination of whether the connection between the source network N11 and the destination network N13 is the connection satisfying a predetermined connection permission condition, such as the communication carriers of both networks having signed regular agreements (step S407).

In the example illustrated in FIG. 4, it is assumed that a negative determination result is obtained in the interconnection determination of step S407 concerning whether the connection permission condition of interconnection of the communication service between the source network N11 and the destination network N13 is satisfied.

The determination result in the interconnection determination of step S407 is returned to the source network N11 (step S408).

Receiving the response of step S408, the source network N11 detects the connection with the third provider P13 (the communication relay apparatus PF13 thereof) (step S409) to connect the source network N11 and the destination network N13 through the provider to transmit data (short message in the case of short message service) subject to transmission. The source network N11 then transmits the data (short message) to the third provider P13 (the communication relay apparatus PF 13 thereof) (step S410).

The transmission in step S410 retains IMSI indicating that the receiving terminal device MS2 is under the management of the destination network N13, and includes information indicating that the destination of the communication message is the destination network N13.

The third provider P13 (the communication relay apparatus PF13 thereof) that has received the transmission data of step S410 issues a inquiry request to the destination network N13 (step S411). When there is a response to the request of step S411 from the destination network N13 (step S412), the third provider P13 transmits the data (short message) to the destination network N13 (step S413).

Figure 5:
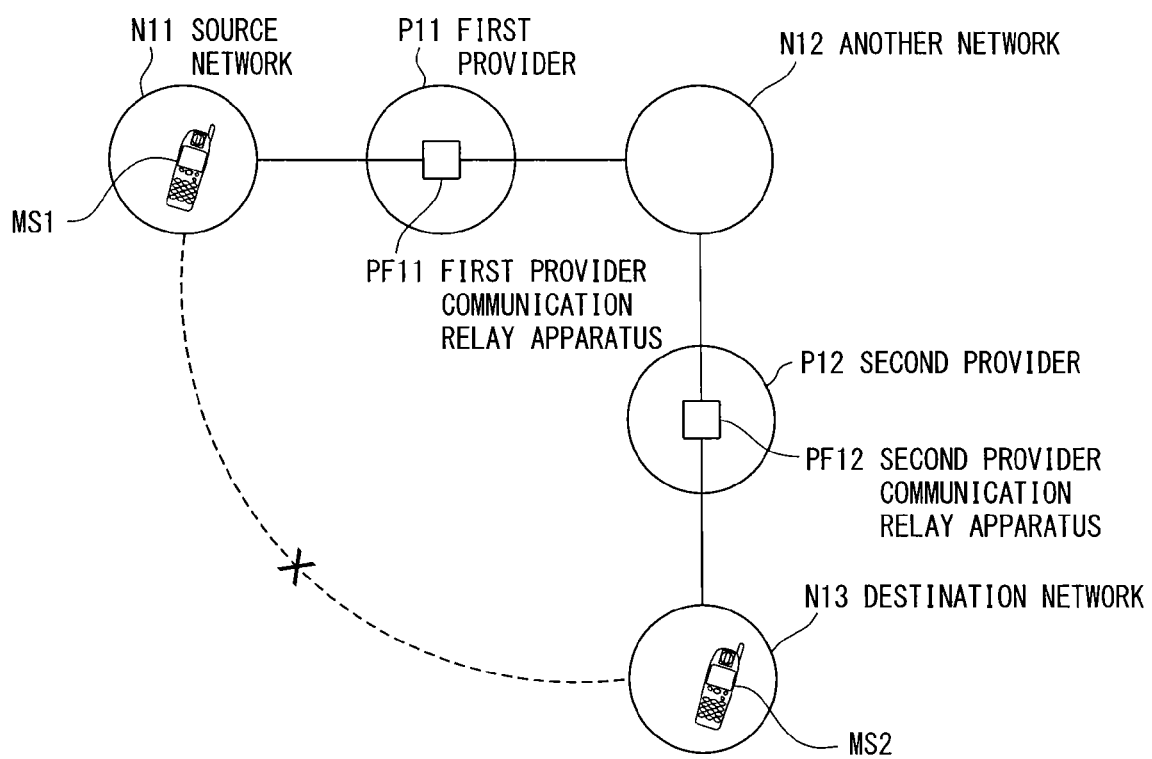
FIG. 5 is a conceptual diagram showing a summary of the communication service management system according to yet another aspect of the present invention.

FIG. 5 is a conceptual diagram showing a summary of the communication service management system according to yet another aspect of the present invention.

In FIG. 5, the parts corresponding to already-described FIG. 1 are shown with the same reference numerals.

In the communication service management system of FIG. 5, data is also transmitted in the store-and-forward system from the calling terminal device MS1 (the source network N11 where the device is located) to the receiving terminal device MS2 (the destination network N13 where the device is located). In the transmission, before the transmission of data (short message in the case of short message service) subject to transmission, it is determined whether interconnection is permitted through a route of the source network N11->the first provider P11 (the communication relay apparatus PF11 thereof)->another network N12->the second provider P12 (the communication relay apparatus PF12 thereof)->the destination network N13.

Here, the transmission of data in the store-and-forward system typically corresponds to transmission of a short message in a short message service. However, under the concept of the present invention, there is no need to limit the data subject to transmission to the short message.

In the configuration of the communication service management system, the difference from already-described FIG. 1 and FIG. 3 is that the transmission of the data (short message in the case of short message service) subject to transmission from the calling terminal device MS1 to the receiving terminal device MS2 through the third provider P13 (the communication relay apparatus PF13 thereof) as in FIG. 3 is not permitted, either.

Figure 6:
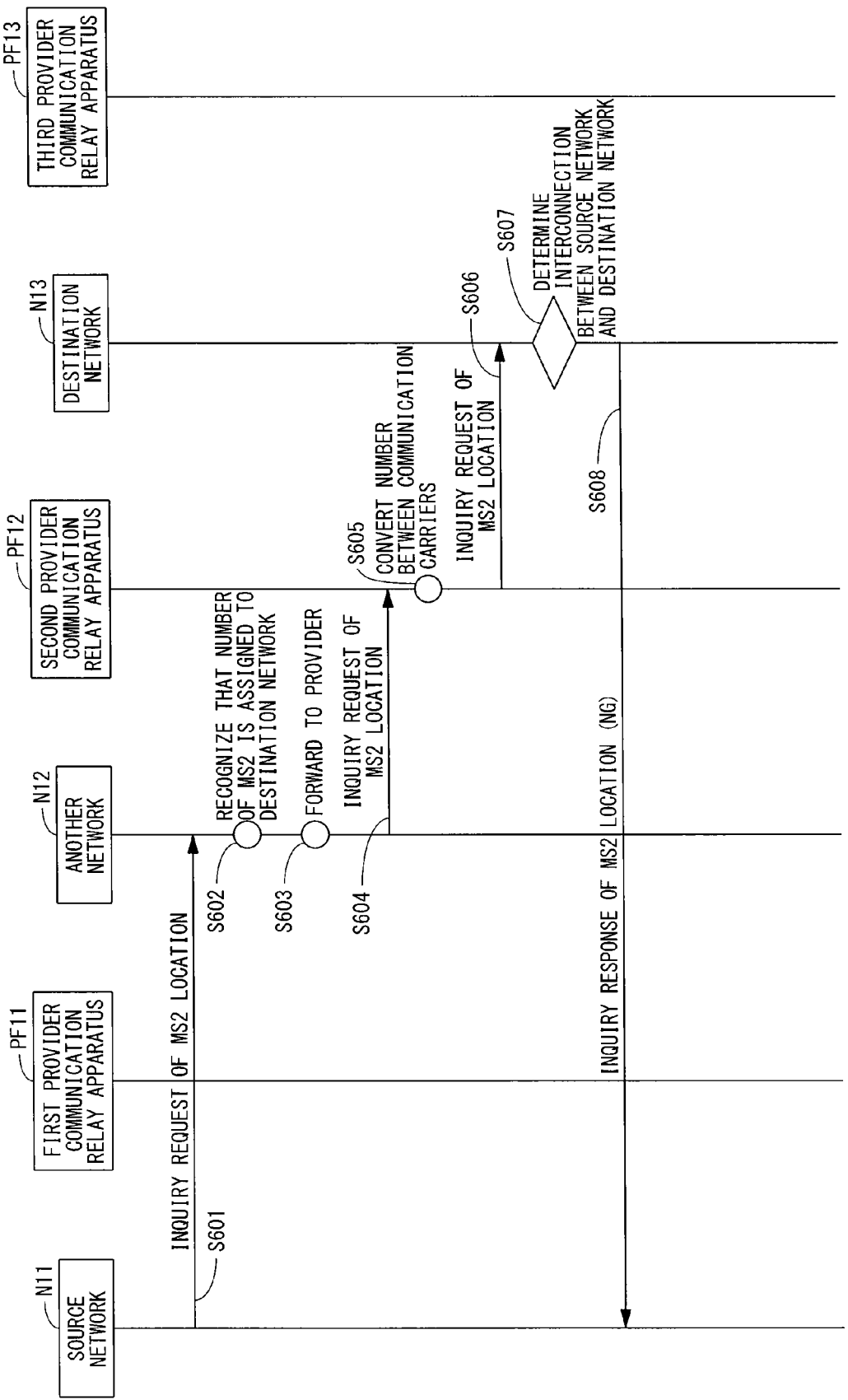
FIG. 6 is a sequence chart showing an operation of the communication service management system in the case of FIG. 5.

FIG. 6 is a sequence chart showing an operation of the communication service management in the case of FIG. 5.

Also in FIG. 6, the connection between the source network N11 and the destination network N13 is also established through the first provider P11 (the communication relay apparatus PF 11 thereof) and the second provider P12 (the communication relay apparatus PF12 thereof). The connection determination is performed such that the source network N11 executes a location inquiry before the transmission of data (short message in the case of short message service) subject to transmission.

However, FIG. 6 illustrates a case in which connection between the source network N11 and the destination network N13 is determined to be unacceptable, and the transmission of the data (short message) through the third provider P13 (the communication relay apparatus PF13 thereof) described with reference to FIG. 4 is not permitted.

Next, the communication service management system will be further described with reference to FIG. 5 and FIG. 6, as necessary.

In the transmission of a message from the calling terminal device MS1 to the receiving terminal device MS2, the source network N11 issues an inquiry request of the receiving terminal device MS2 to another network N12 (step S601).

Once another network N12 that has received the inquiry request in step S601 checks that the telephone number of the receiving terminal device MS2 subject to the inquiry request is paid out to the destination network N13 (step S602), another network N12 forwards the inquiry request to the second provider P12 (the communication relay apparatus PF12 thereof) (step S603->step S604).

As described, it is assumed that the second provider P12 (the communication relay apparatus PF12 thereof) that has received the inquiry request in step S604 is, for example, a so-called SIMN provider. Therefore, the second provider P12 performs incoming call number conversion (step S603) and issues a inquiry request to the destination network N13 (step S606).

The inquiry requests in steps S601, S604, and S606 include connection determination requests for requesting the communication carrier of the destination network N13 to perform connection determination of whether the connection of the communication service of FIG. 1 satisfies a predetermined connection permission condition.

More specifically, the source network N11, another network N12, and the second provider (the communication relay apparatus PF12 thereof) each comprise connection determination request means (not shown) for requesting to perform the connection determination.

In the present embodiment, the information (number) indicating the communication carrier of the source network N11 that is the initial transmission source of the calling side is maintained in the procedure of steps S601 to S606.

This is maintained by including a request for maintaining the information (number) indicating the communication carrier of the source network N11 in the transmission of information in steps S601 and S604 and the address information storage means for storing the information (number) indicating the communication carrier of the source network N11 is included in each of another network N12 and the second provider P12.

Therefore, the destination network N13 that has received the inquiry request of step S606 is capable of accurately recognizing the communication carrier of the source network N11 from the maintained number.

Based on the recognition, the destination network N13 executes interconnection determination of whether the connection between the source network N11 and the destination network N13 is the connection satisfying a predetermined connection permission condition, such as the communication carriers of both networks having signed regular agreements (step S607).

As described, under the condition shown in FIG. 5 and FIG. 6, it is determined that the connection between the source network N11 and the destination network N13 is not permitted in the interconnection determination of step S607, and the transmission of the data (short message) through the third provider P13 (the communication relay apparatus PF13 thereof) as described with reference to FIG. 4 is not permitted.

Consequently, on the basis of the interconnection determination result, the destination network N13 returns a response of connection denial (NG) to the source network N1 (step S608).

Therefore, between the source network N11 and the destination network N13 in which the requirement of connection is not satisfied, the substantial connection of the data (short message) that is originally subject to transmission is denied, so the possibility of transmission or reception of an inappropriate message is prevented.

Figure 7:
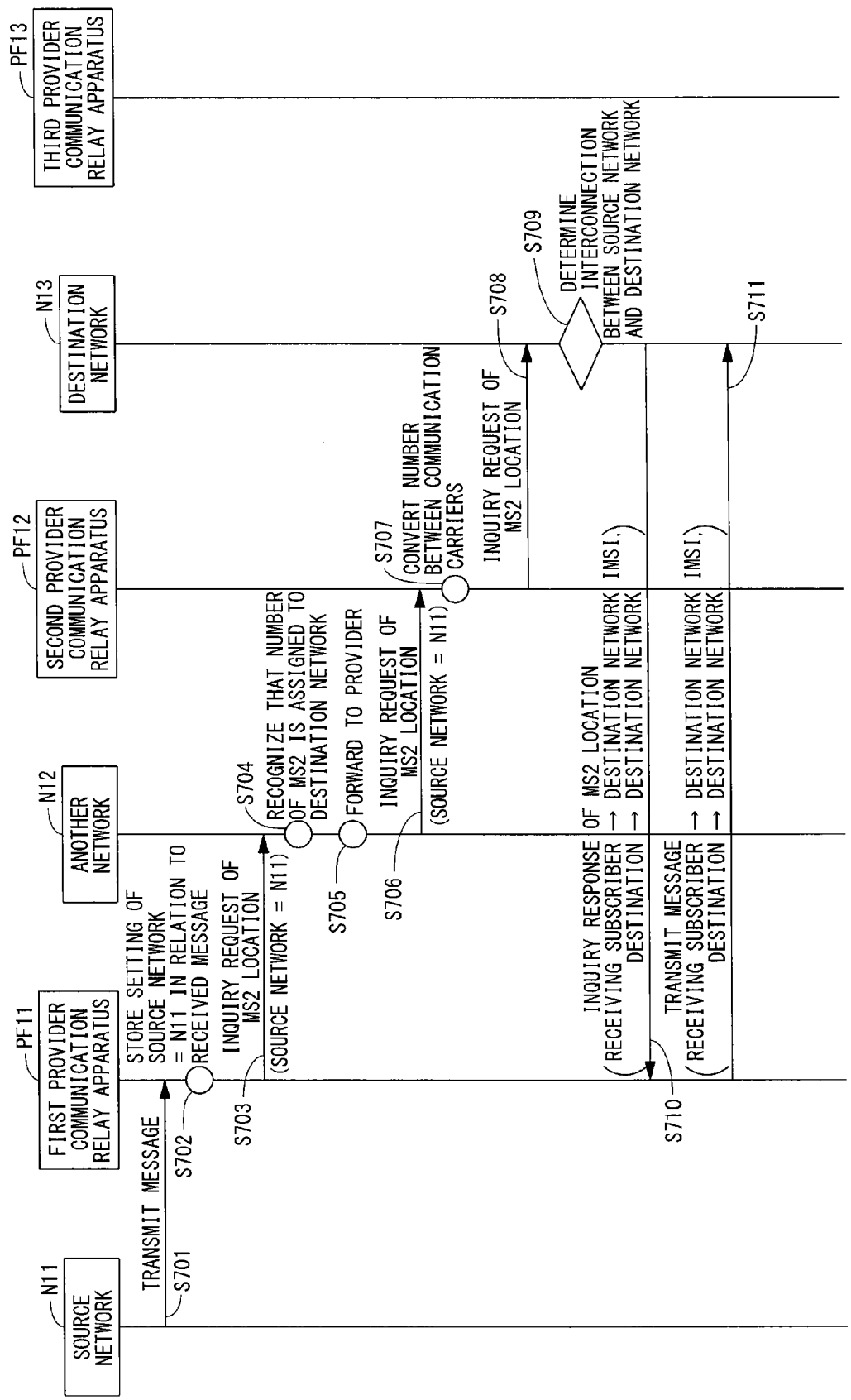
FIG. 7 is a sequence chart showing an operation of the communication service management system, in a case where data (short message) is transmitted from a source network to a first provider communication relay apparatus, while the same arrangement as in FIG. 1 is employed for the networks and the providers.

FIG. 7 is a sequence chart showing an operation of the communication service management system, in a case where data (short message) is transmitted from the source network to the first provider communication relay apparatus PF11, while the same arrangement as in FIG. 1 is employed for the source network and the destination network as well as another network and the providers existing between the source network and the destination network.

Next, the communication service management system will be described further with reference to FIG. 7 and FIG. 1, as necessary.

The source network N11 transmits the data (short message) subject to transmission to the first provider P11 (the communication relay apparatus PF11 thereof) (step S701).

In the transmission of step S701, information (number) indicating the communication carrier of the source network N11 is also attached to the data and transmitted.

The first provider P11 (the communication relay apparatus PF11 thereof) that has received the data (message) transmitted in step S701 and the information (number) indicating the communication carrier of the source network N11 holds the information (number) in relation to the information (number) indicating the communication carrier of the source network N11 (step S702).

The address information storage means included in the first provider P11 (the communication relay apparatus PF11 thereof) stores the information in step S702.

Next, the first provider P11 (the communication relay apparatus PF11 thereof) handles N11 as the source network and issues a inquiry request to another network N12 (step S703).

The inquiry request in step S703 is performed by handling the transmission source (source network) N11 in the message transmission in step S701 as the transmission source (source network).

Another network N12 that has received the inquiry request of step S703 checks that the destination number is assigned to the destination network N13 (step S704) and prepares to forward to the second provider P12 (the communication relay apparatus PF12 thereof) (step S705).

After preparing to forward in step S705, another network N12 maintains the source network at N11 and issues a inquiry request to the second provider P12 (the communication relay apparatus PF12 thereof) (step S706).

As described, the second provider P12 (the communication relay apparatus PF12 thereof) is, for example, a so-called SIMN provider that converts telephone numbers between the communication carriers The second provider P12 converts the incoming call number when the inquiry request in step S706 is received (step S707).

Subsequent to step S707, the second provider P12 (the communication relay apparatus PF12 thereof) issues a inquiry request to the destination network N13 (step S708).

In the present embodiment, the information (number) indicating the communication carrier of the source network N11 that is the initial transmission source on the calling side in the procedure of steps S701 to S707 is held as described above and maintained by prohibiting overwriting.

Therefore, the destination network N13 that has received the inquiry request of step S708 is capable of accurately recognizing the communication carrier of the source network N11 from the maintained number.

Based on the recognition, the destination network N13 executes interconnection determination of whether the connection between the source network N11 and the destination network N13 is the connection satisfying a predetermined connection permission condition, such as the communication carriers of both networks having signed regular agreements (step S709).

In the example illustrated in FIG. 7, it is assumed that a positive determination result is obtained in the interconnection determination of step S709 concerning whether the connection of the communication service between the source network N11 and the destination network N13 satisfies the predetermined connection permission condition.

Therefore, the destination network N13 makes a location inquiry response to the source network N11 as a response to the inquiry request in step S701 (steps S703 to S708 in response to this) (step S710).

The location inquiry response of step S710 retains IMSI indicating that the receiving terminal device MS2 is under the management of the destination network N13 and includes information indicating that the destination of the communication message is the destination network N13.

The first provider P11 (the communication relay apparatus PF11 thereof) that has received the location inquiry response of step S710 transmits the data (short message in the case of short message service) subject to transmission in the communication service management system to the destination network N13 (step S711).

The information transmitted in step S711 includes information indicating that the receiving terminal device MS2 is the IMSI of the destination network N13 and that the destination of the communication message is the destination network N13.

Through the procedure of steps S701 to S711, the data (short message in the case of short message service) subject to transmission is transmitted from the calling terminal device MS1 to the receiving terminal device MS2 in a normal connection in the communication service management system.

Figure 8:
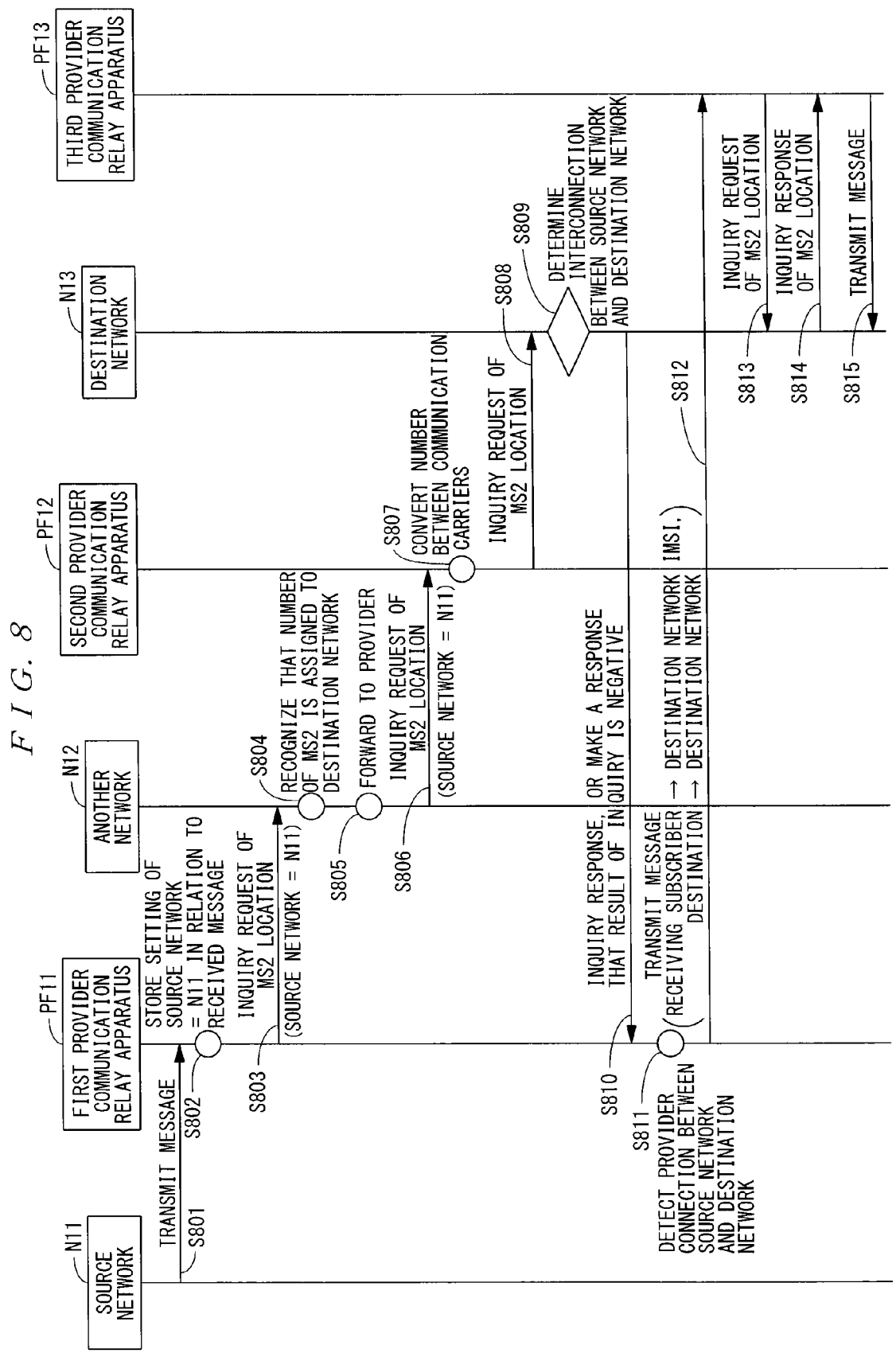
FIG. 8 is a sequence chart showing an operation of the communication service management system, in a case where data (short message) is transmitted from the source network to the first provider communication relay apparatus, while the same arrangement as in FIG. 3 is employed for the networks and the providers.

FIG. 8 is a sequence chart showing an operation of the communication service management system, in a case where data (short message) is transmitted from the source network to the first provider communication relay apparatus PF11, while the same arrangement as in FIG. 3 is employed for the source network and the destination network as well as another e network and the providers existing between the source network and the destination network.

Next, the communication service management system of the present invention will be described further with reference to FIG. 8 and FIG. 3, as necessary.

The source network N11 transmits data (short message) subject to transmission to the first provider P11 (the communication relay apparatus PF11 thereof) (step S801).

In the transmission of step S801, information (number) indicating the communication carrier of the source network N11 is attached to the data and transmitted.

The first provider P11 (the communication relay apparatus PF11 thereof) that has received the data (message) and the information (number) indicating the communication carrier of the source network N11 transmitted in step S801 holds the information (number) in relation to the information (number) indicating the communication carrier of the source network N11 (step S802).

The address information storage means included in the first provider P11 (communication relay apparatus PF11 thereof) stores the information in step S802.

Next, the first provider P11 (the communication relay apparatus PF11 thereof) handles N11 as the source network, and issues a inquiry request to another network N12 (step S803).

The inquiry request in step S803 is performed by handling the transmission source (source network) N11 in the message transmission of step S801 as the transmission source (source network).

Another network N12 that has received the inquiry request of step S803 checks that the destination number is assigned to the destination network N13 (step S804) and prepares to forward to the second provider P12 (the communication relay apparatus PF12 thereof) (step S805).

After preparing to forward in step S805, another network N12 maintains the source network to N11 and issues a inquiry request to the second provider P12 (the communication relay apparatus PF12 thereof) (step S806).

As described, the second provider P12 (the communication relay apparatus PF12 thereof) is, for example, a so-called SIMN provider that converts telephone numbers between the communication carriers, and the second provider P12 converts the incoming call number when the inquiry request in step S806 is received (step S807).

Subsequent to step S807, the second provider P12 (the communication relay apparatus PF12 thereof) issues a inquiry request to the destination network N13 (step S808).

In the present embodiment, the information (number) indicating the communication carrier of the source network N11 that is the initial transmission source on the calling side is held in the procedure of steps S801 to S808 as described above and maintained by prohibiting overwriting.

Therefore, the destination network N13 that has received the inquiry request of step S808 is capable of accurately recognizing the communication carrier of the source network N11 from the maintained number.

Based on the recognition, the destination network N13 executes interconnection determination of whether the connection between the source network N11 and the destination network N13 is the connection satisfying a predetermined connection permission condition, such as the communication carriers of both networks having signed regular agreements (step S809).

In the example illustrated in FIG. 8, it is assumed that a negative determination result is obtained in the interconnection determination of step S809 concerning whether the connection permission condition of interconnection of the communication service between the source network N11 and the destination network N13 is satisfied.

The determination result in the interconnection determination of step S809 is returned to the first provider P11 (the communication relay apparatus PF11 thereof) (step S810).

After receiving the response of step S810, the first provider P11 (the communication relay apparatus PF11 thereof) detects connection with the third provider P13 (the communication relay apparatus PF13 thereof) (step 5811) to connect the source network N11 and the destination network N13 through the provider to transmit the data (short message in the case of short message service) subject to transmission and transmits the data (short message) to the third provider P13 (the communication relay apparatus PF13 thereof) (step S812).

In the transmission of step S812, IMSI indicating that the receiving terminal device MS2 is under the management of the destination network N13 is retained, and information indicating that the destination of the communication message is the destination network N13 is included.

The third provider P13 (the communication relay apparatus PF13 thereof) that has received the transmission data of step S812 issues a inquiry request to the destination network N13 (step S813), and when there is a response to the request of step S813 from the destination network N13 (step S814), transmits the data (short message) to the destination network N13 (step S815).

Figure 9:
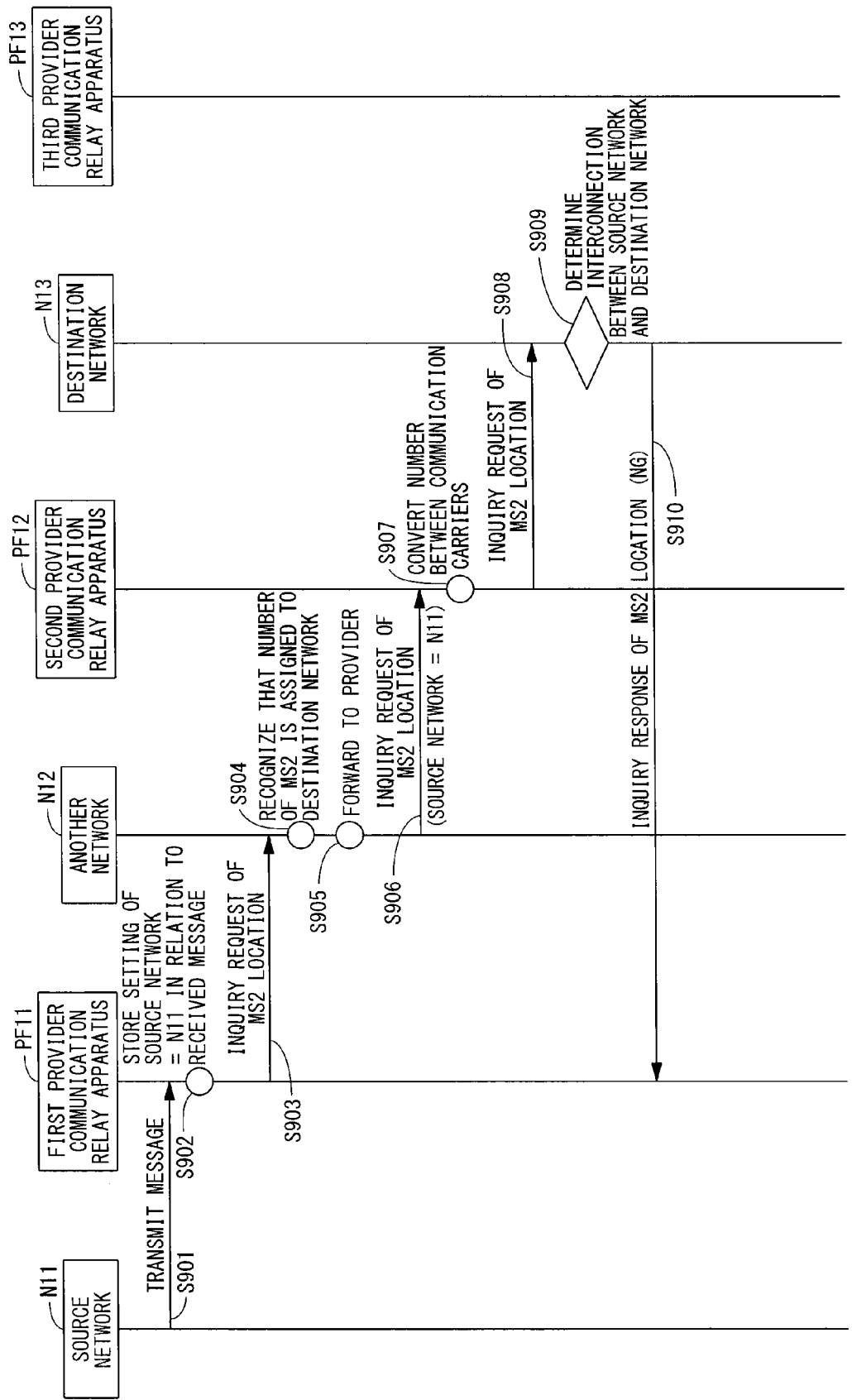
FIG. 9 is a sequence chart showing an operation of the communication service management system, in a case where data (short message) is transmitted from the source network to the first provider communication relay apparatus, while the same arrangement as in FIG. 5 is employed for the networks and the providers.

FIG. 9 is a sequence chart showing an operation of the communication service management system, in a case where data (short message) is transmitted from the source network to the first provider communication relay apparatus PF11, while the same arrangement as in FIG. 5 is employed for the source network and the destination network as well as another network and the providers existing between the source network and the destination network.

Next, the communication service management system of the present invention will be further described with reference to FIG. 9 and FIG. 5, as necessary.

The source network N11 transmits the data (short message) subject to transmission to the first provider P11 (the communication relay apparatus PF11 thereof) (step S901).

In the transmission of step S901, information (number) indicating the communication carrier of the source network N11 is attached to the data and transmitted.

The first provider P11 (the communication relay apparatus PF11 thereof) that has received the data (message) and the information (number) indicating the communication carrier of the source network N11 transmitted in step S901 holds the information (number) in relation to the information (number) indicating the communication carrier of the source network N11 (step S902).

The address information storage means included in the first provider P11 (the communication relay apparatus PF11 thereof) stores the information in step S902.

Next, the first provider P11 (the communication relay apparatus PF11 thereof) handles N11 as the source network and issues a inquiry request to another network N12 (step S903).

The inquiry request in step S903 is performed by handling the transmission source (source network) N11 in the message transmission of step s901 as the transmission source (source network).

Another network N12 that has received the inquiry request of step S903 checks that the destination number is assigned to the destination network N13 (step S904) and prepares to forward to the second provider P12 (the communication relay apparatus PF12 thereof) (step S905).

After preparing to forward in step S905, another network N12 maintains the source network at N11 and issues a inquiry request to the second provider P12 (the communication relay apparatus PF12 thereof) (step S906).

As described, the second provider P12 (the communication relay apparatus PF12 thereof) is, for example, a so-called SIMN provider that converts telephone numbers between the communication carriers, and the second provider P12 converts the incoming call number when the inquiry request in step S906 is received (step S907).

Subsequent to step S907, the second provider P12 (the communication relay apparatus PF12 thereof) issues a inquiry request to the destination network N13 (step S908).

In the present embodiment, the information (number) indicating the communication carrier of the source network N11 that is the initial transmission source on the calling side is held as described above and maintained by prohibiting overwriting in the procedure of steps S901 to S908.

Therefore, the destination network N13 that has received the inquiry request of step S908 is capable of accurately recognizing the communication carrier of the source network N11 from the maintained number.

Based on the recognition, the destination network N13 executes interconnection determination of whether the connection between the source network N11 and the destination network N13 is the connection satisfying a predetermined connection permission condition, such as the communication carriers of both networks having signed regular agreements (step S909).

As described with reference to FIG. 5, under the conditions shown in FIG. 9 and FIG. 5, it is determined that the connection between the source network N11 and the destination network N13 is not permitted in the interconnection determination of step S909, and the transmission of the data (short message) through the third provider P13 (the communication relay apparatus PF13 thereof) described with reference to FIG. 4 is not permitted.

Consequently, on the basis of the interconnection determination result, the destination network N13 returns a response of connection denial (NG) to the first provider P11 (the communication relay apparatus PF11 thereof) (step S910).

Therefore, between the source network N11 and the destination network N13 that do not satisfy the requirement of connection, substantial connection of the data (short message) originally subject to transmission is denied, and transmission or reception of an inappropriate message is prevented.

Figure 10:
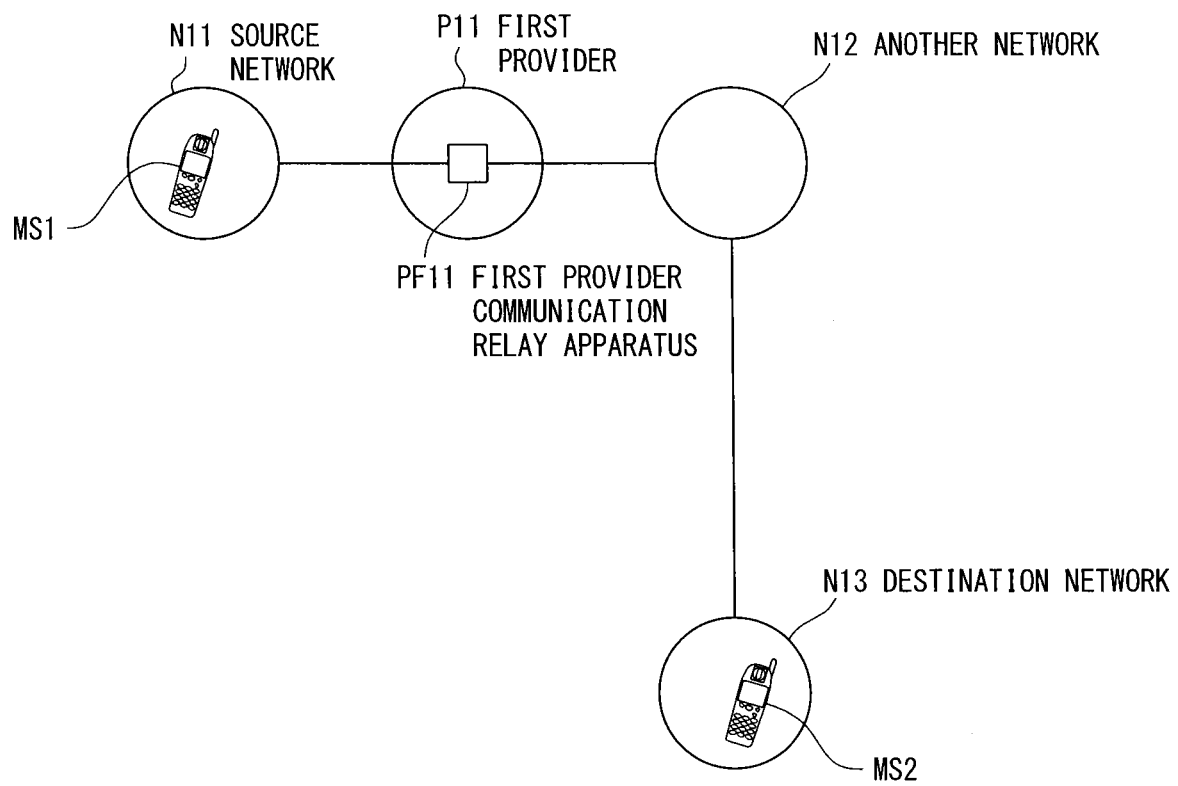
FIG. 10 is a conceptual diagram showing a summary of the communication service management system according to yet another aspect of the present invention.

FIG. 10 is a conceptual diagram showing a summary of the communication service management system according to yet another aspect of the present invention.

In FIG. 10, the parts corresponding to already-described FIG. 1 are shown with the same reference numerals. In the communication service management system of FIG. 10, the second provider PF12 (therefore, the second provider communication relay apparatus PF12) in the communication service management system of FIG. 1 is not included.

In the communication service management system of FIG. 1, data is transmitted in the store-and-forward system from the source network N11 (where the calling terminal device MS1 is located in the illustrated example) to the destination network N13 (where the receiving terminal device MS2 is located in the illustrated example). In the transmission, the data (short message in the case of short message service) subject to transmission is uniformly transmitted from the source network N11 to the first provider P11 (the communication relay apparatus PF11 thereof). Whether interconnection is permitted through a route of the communication relay apparatus PF11->another network N12->the destination network N13 is determined.

It is assumed that another network N12 and the destination network N13 have concluded a treaty for mutually carrying out the number portability. It is also assumed that the source network N11 and the destination network N13 have signed carrier agreements of the connection of line.

Here, the transmission of data in the store-and-forward system typically corresponds to transmission of a short message in a short message service. However, under the concept of the present invention, there is no need to limit the data subject to transmission to the short message.

In the examples to be described below, it is assumed that the first provider P11 is a so-called SMS provider that establishes interconnection of the short message service between the communication carriers.

The first provider P11 (the communication relay apparatus PF thereof) in the communication service management system is, for example, a so-called SMS provider including address information storage means described later. When address information indicating the source network of the calling terminal device MS1 attached to the data (for example, short message) to be relayed is stored, the address information storage means store the address information.

Meanwhile, unlike the examples of already-described FIG. 1 to FIG. 9, connection determination means of the destination network 13 executes connection determination of whether the connection of the communication service of FIG. 10 satisfies a predetermined connection permission condition.

Figure 11:
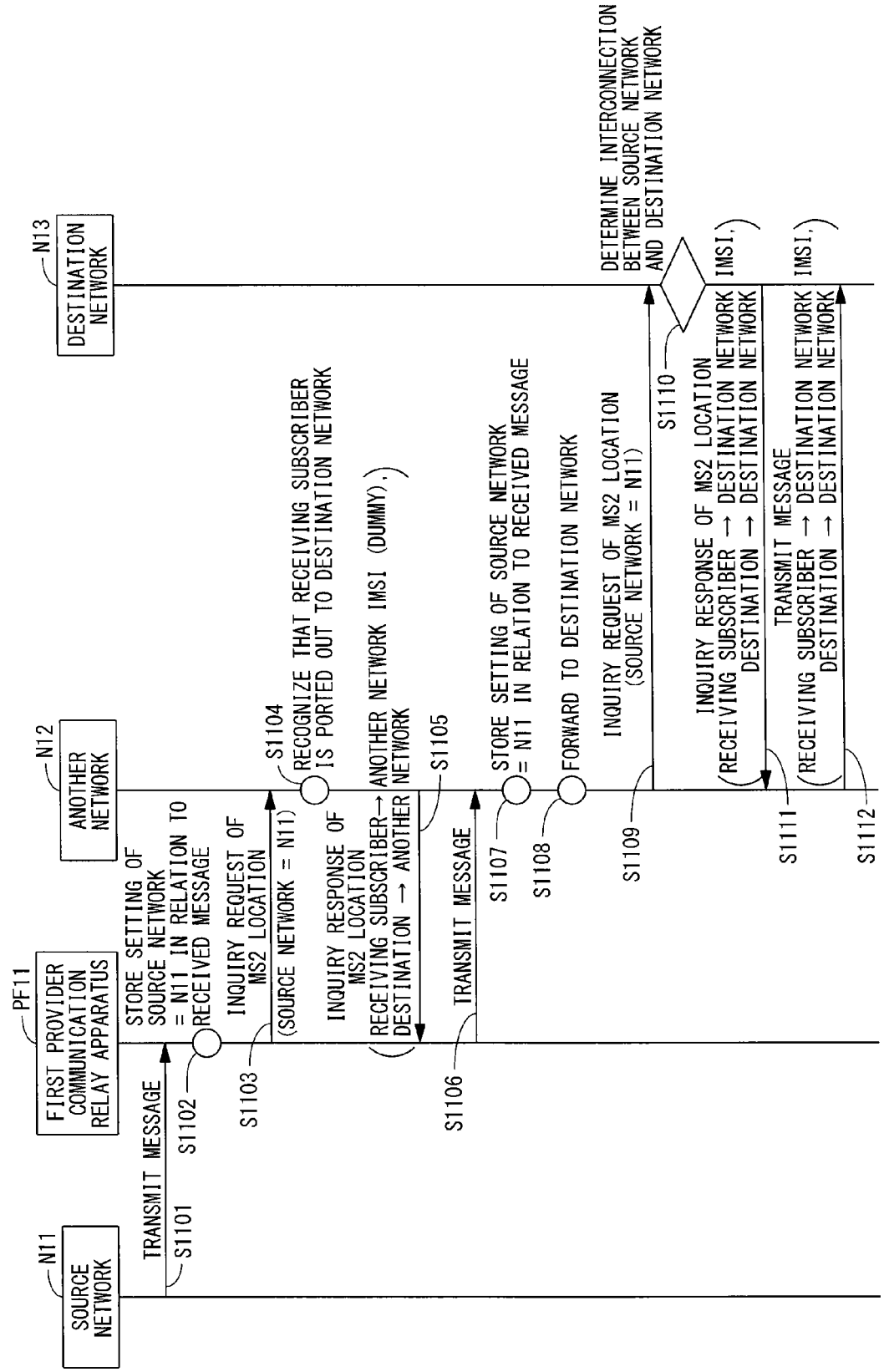
FIG. 11 is a sequence chart showing an operation of the communication service management system in the case of FIG. 10.

FIG. 11 is a sequence chart showing an operation of the communication service management system in the case of FIG. 10.

The source network N11 transmits the data (short message) subject to transmission to the first provider P11 (the communication relay apparatus PF11 thereof) (step S1101).

In the transmission of step S1101, information (number) indicating the communication carrier of the source network N11 is attached to the data and transmitted.

The first provider P11 (the communication relay apparatus PF11 thereof) that has received the data (message) and the information (number) indicating the communication carrier of the source network N11 transmitted in step S1101 holds the information (number) in relation to the information (number) indicating the communication carrier of the source network N11 (step S1102).

The address information storage means included in the first provider P11 (the communication relay apparatus PF11 thereof) stores the information in step S1102.

Next, the first provider P11 (the communication relay apparatus PF11 thereof) handles N11 as the source network and issues a inquiry request to another network N12 (step S1103).

Another network N12 that has received the inquiry request in step S1103 recognizes that the receiving subscriber is ported out to the destination network N13 (step S1104).

Another network N12 that has recognized in step S1104 that the receiving subscriber is ported out to the destination network N13 makes a location inquiry response to the first provider P11 (the communication relay apparatus PF11 thereof) (step S1105). In the location inquiry response of step S1105, the receiving subscriber is indicated by a dummy IMSI in another network N12, and another network N12 is handled as the destination.

The first provider P11 (the communication relay apparatus PF11 thereof) that has received the location inquiry response of step S1105 transmits a message to another network N12 (step S1106).

Another network N12 that has received the message transmitted in step S1106 holds the information (number) in relation to the information (number) indicating the communication carrier of the source network N11 concerning the received message (step S1107).

Subsequent to step S1107, another network N12 makes an operation to forward the message received in step S1106 to the destination network N13 (step S1108).

Subsequent to step S1108, another network N12 transmits a inquiry request to the destination network N13 (step S1109). The inquiry request in step S1109 is issued by maintaining the source network at N11.

The destination network N13 that has received the inquiry request of step S1109 executes interconnection determination of whether the connection between the source network N11 and the destination network N13 is the connection satisfying a predetermined connection permission condition, such as the communication carriers of both networks having signed regular agreements (step S1110).

In the interconnection determination of step S1110, in the procedure of steps S1101 to S1109, the information (number) indicating the communication carrier of the source network N11 that is the initial transmission source on the calling side is maintained as described. Therefore, the destination network N13 recognizes the maintained information (number) indicating the communication carrier of the source network N11 to accurately perform the interconnection determination.

In the example shown in FIG. 10 and FIG. 11, it is assumed that a positive determination result is obtained in the interconnection determination of step S1110 concerning whether the connection permission condition of interconnection of the communication service between the source network N11 and the destination network N13 is satisfied.

The positive determination result in the interconnection determination of step S1110 is returned to another network N12 as a location inquiry response (step S1111). In the location inquiry response of step S1111, the receiving subscriber is indicated by the IMSI of the destination network N13, and the destination network N13 is handled as the destination.

Another network N12 that has received the location inquiry response in step S1111 transmits the message to the destination network N13 (step S1112). In the transmission of message in step S1112, the receiving subscriber is indicated by the IMSI of the destination network N1, and the destination is the destination network N13.

Figure 12:
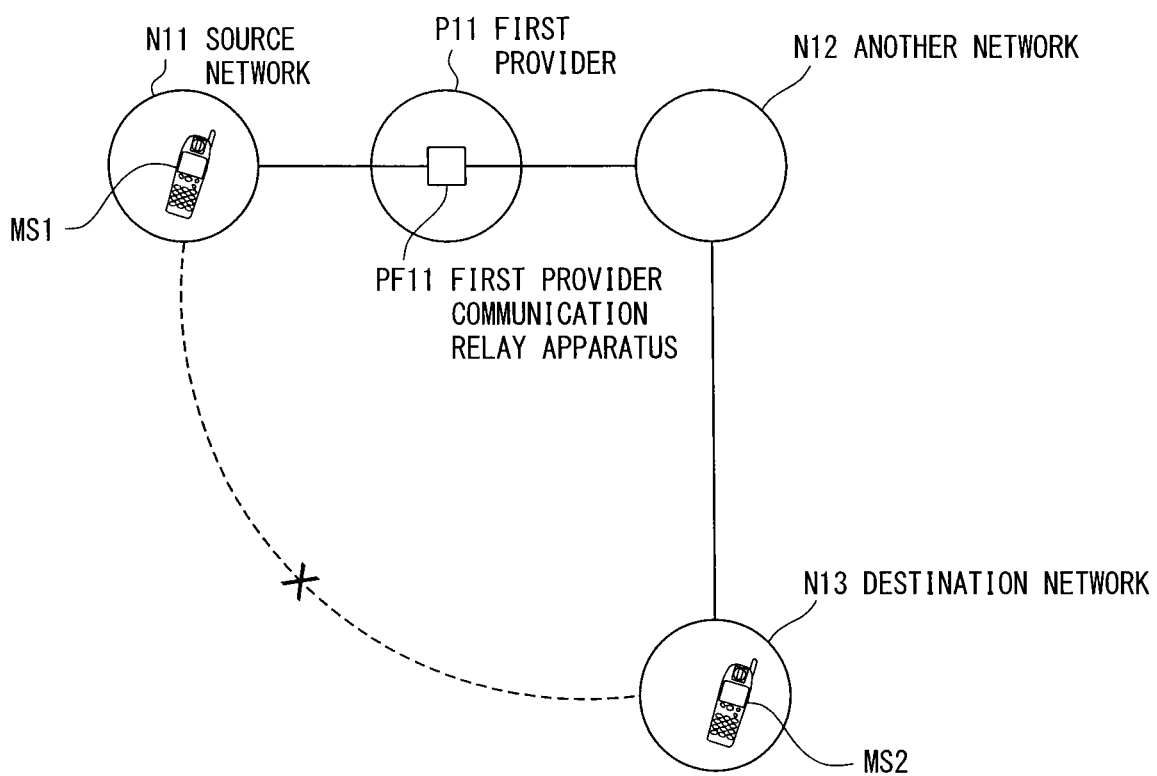
FIG. 12 is a conceptual diagram showing a summary of the communication service management system according to yet another aspect of the present invention.

FIG. 12 is a conceptual diagram showing a summary of the communication service management system according to yet another aspect of the present invention. In FIG. 12, the parts corresponding to already-described FIG. 1 are shown with the same reference numerals.

In the communication service management system shown in FIG. 12, the second provider P12 (the communication relay apparatus PF12 thereof) in the communication service management system of FIG. 5 is not included.

In the communication service management system of FIG. 12, data is transmitted in the store-and-forward system from the calling terminal device MS1 (the source network N11 where the device is located) to the receiving terminal device MS2 (the destination network N13 where the device is located). In the transmission, the data (short message in the case of short message service) subject to transmission is uniformly transmitted from the source network N11 to the first provider P11 (the communication relay apparatus PF11 thereof). Whether interconnection through a route of the communication relay apparatus PF11->another network 12->the destination network N13 is permitted is determined.

It is assumed that another network N12 and the destination network N13 have concluded a treaty for mutually carrying out the number portability. It is also assumed that the source network N11 and the destination network N13 have signed carrier agreements for the connection of line.

Here, the transmission of data in the store-and-forward system typically corresponds to transmission of a short message in a short message service. However, under the concept of the present invention, there is no need to limit the data subject to transmission to the short message.

In the communication service management system of FIG. 12, a condition is assumed in which transmission of data (short message in the case of short message service) subject to transmission from the calling terminal device MS1 to the receiving terminal device MS2 through another network N12 is not permitted.

Figure 13:
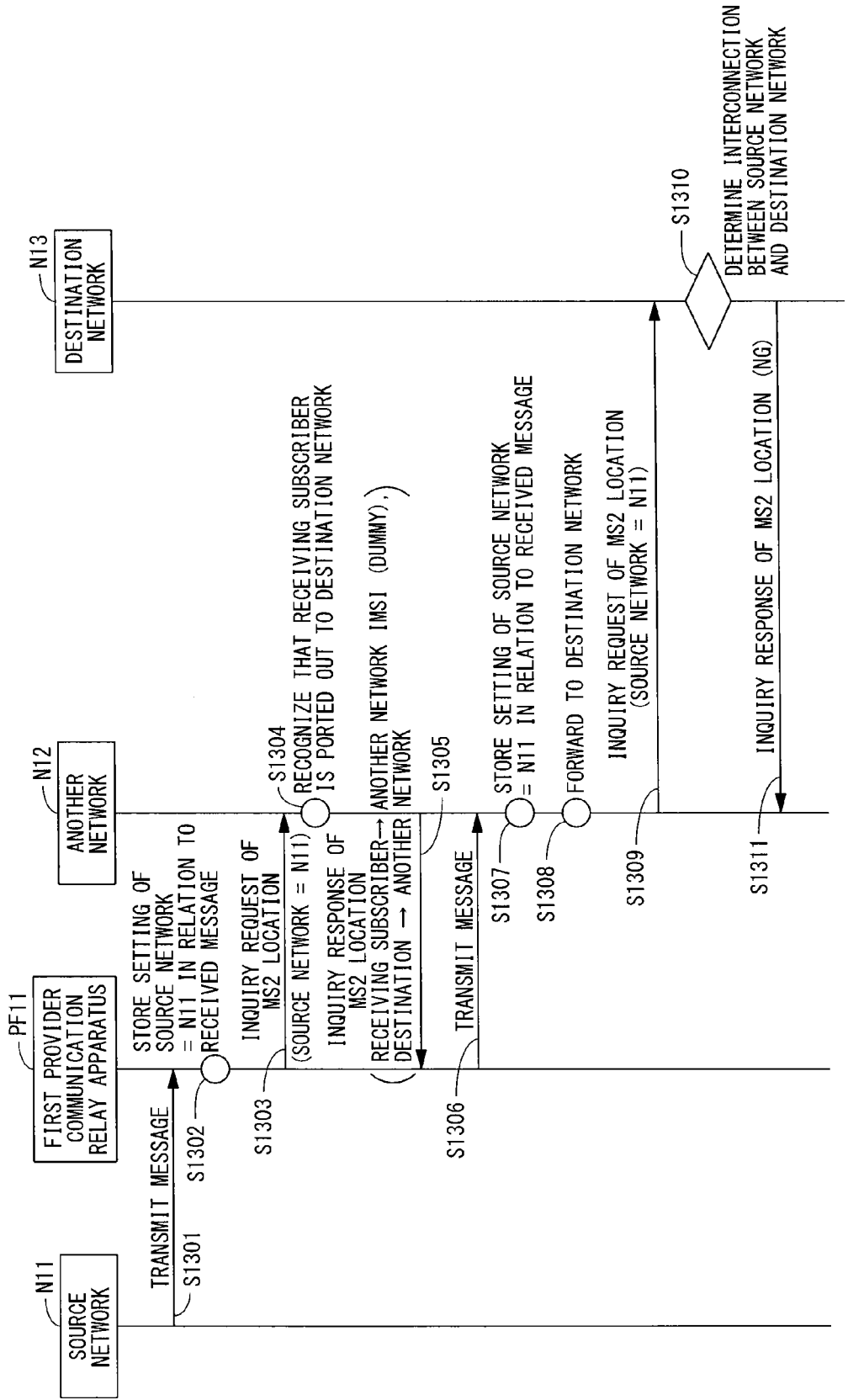
FIG. 13 is a conceptual diagram showing a summary of the communication service management system according to yet another aspect of the present invention.

FIG. 13 is a sequence chart showing an operation of the communication service management system in the case of FIG. 12.

The source network N11 transmits data (short message) subject to transmission to the first provider P11 (the communication relay apparatus PF11 thereof) (step S1301).

In the transmission of step S1301, information (number) indicating the communication carrier of the source network N11 is attached to the data and transmitted.

The first provider P11 (the communication relay apparatus PF11 thereof) that has received the data (message) and the information (number) indicating the communication carrier of the source network N11 transmitted in step S1301 holds the information (number) in relation to the information (number) indicating the communication carrier of the source network N11 (step S1302).

The address information storage means included in the first provider P11 (the communication relay apparatus PF11 thereof) stores the information in step S1302.

Next, the first provider P11 (the communication relay apparatus PF11 thereof) handles N11 as the source network to issue a inquiry request to another network N12 (step S1303).

Another network N12 that has received the inquiry request in step S1303 recognizes that the receiving subscriber is ported out to the destination network N13 (step S1304).

Another network N12 that has recognized in step S1304 that the receiving subscriber is ported out to the destination network N13 makes a location inquiry response to the first provider P11 (the communication relay apparatus PF11 thereof) (step S1305). In the location inquiry response of step S1305, the receiving subscriber is indicated by a dummy IMSI in another network N12, and another network N12 is handled as the destination.

The first provider P11 (the communication relay apparatus PF11 thereof) that has received the location inquiry response of step S1305 transmits the message to another network N12 (step S1306).

Another network N12 that has received the message transmitted in step S1306 holds the information (number) in relation to the information (number) indicating the communication carrier of the source network N11 concerning the received message (step S1307).

Subsequent to step S1307, another network N12 makes an operation to forward the message received in step S1106 to the destination network N13 (step S1308).

Subsequent to step S1308, another network N12 transmits a inquiry request to the destination network N13 (step S1309). The inquiry request in step S1309 is issued by maintaining the source network at N11.

The destination network N13 that has received the inquiry request of step S1309 executes interconnection determination of whether the connection between the source network N11 and the destination network N13 is the connection satisfying a predetermined connection permission condition, such as the communication carriers of both networks having signed regular agreements (step S1310).

In the interconnection determination of step S1310, in the procedure of steps S1301 to S1309, the information (number) indicating the communication carrier of the source network N11 that is the initial transmission source on the calling side is maintained as described. Therefore, the destination network N13 recognizes the maintained information (number) indicating the communication carrier of the source network N11 to accurately perform the interconnection determination.

In the example shown in FIG. 12 and FIG. 13, it is assumed that a negative determination result is obtained in the interconnection determination of step S1310 concerning whether the connection permission condition of interconnection of the communication service between the source network N11 and the destination network N13 is satisfied.

The negative determination result in the interconnection determination of step S1310 is returned to another network N12 as a location inquiry response (NG) (step S1311).

Therefore, substantial connection of the data (short message) originally subject to transmission is denied between the source network N11 and the destination network N13, which does not satisfy the requirement of connection, so the possibility of transmission or reception of an inappropriate message is prevented.

Figure 14:
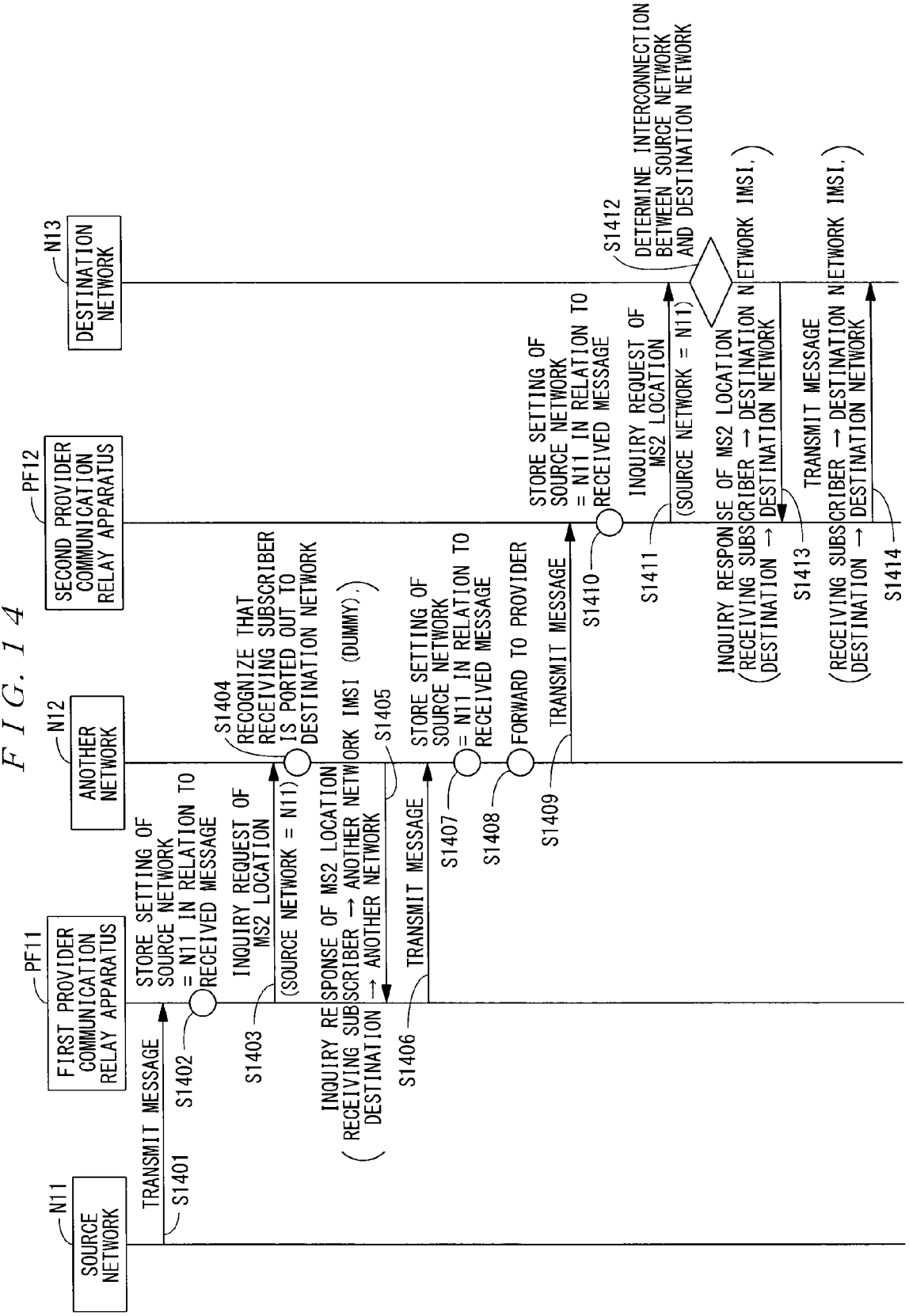
FIG. 14 is a sequence chart showing an operation of the communication service management system according to yet another aspect of the present invention.

FIG. 14 is a sequence chart showing an operation of the communication service management system, in a case where data (short message) is transmitted from the source network to the first provider communication relay apparatus PF11, while the same arrangement as in FIG. 1 is employed for the source network and the destination network as well as another network and the providers existing between the source network and the destination network.

It is assumed that the data (short message in the case of short message service) subject to transmission is uniformly transmitted from the source network N11 to the first provider P11 (the communication relay apparatus PF11 thereof). Whether interconnection is permitted through a route of the communication relay apparatus PF 11->another network N12->the destination network N13 is determined.

It is also assumed that another network N12 and the destination network N13 have concluded a treaty for mutually carrying out the number portability. It is further assumed that the source network N11 and the destination network N13 have signed carrier agreements for the connection of line.

Next, the communication service management system will be described further with reference to FIG. 14 and FIG. 1, as necessary.

The source network N11 transmits data (short message) subject to transmission to the first provider P11 (the communication relay apparatus PF11 thereof) (step S1401).

In the transmission of step S1401, information (number) indicating the communication carrier of the source network N11 is attached to the data and transmitted.

The first provider P11 (the communication relay apparatus PF11 thereof) that has received the data (message) and the information (number) indicating the communication carrier of the source network N11 transmitted in step S1401 holds the information (number) in relation to the information (number) indicating the communication carrier of the source network N11 (step S1402).

The address information storage means included in the first provider P11 (the communication relay apparatus PF11 thereof) stores the information in step S1402.

Next, the first provider P11 (the communication relay apparatus PF11 thereof) issues a inquiry request to another network N12 (step S1403).

The inquiry request in step S1403 is performed by handling the transmission source (source network) N11 in the message transmission of step S1401 as the transmission source (source network).

Another network N12 that has received the inquiry request in step S1403 recognizes that the receiving subscriber is ported out to the destination network N13 (step S1404).

Another network N12 that has recognized in step S1404 that the receiving subscriber is ported out to the destination network N13 makes a location inquiry response to the first provider P11 (the communication relay apparatus PF11 thereof) (step S1405). In the location inquiry response of step S1405, the receiving subscriber is indicated by a dummy IMSI in another network N12, and another network N12 is handled as the destination.

The first provider P11 (the communication relay apparatus PF11 thereof) that has received the location inquiry response of step S1405 transmits the message to another network N12 (step S1406).

Another network N12 that has received the message transmitted in step S1406 holds the information (number) in relation to the information (number) indicating the communication carrier of the source network N11 concerning the received message (step S1407).

Subsequent to step S1407, another network N12 makes an operation to forward the message received in step S1401 to the destination network N13 (step S1408).

Subsequent to step S1408, another network N12 transmits the data (short message) subject to transmission to the second provider P12 (the communication relay apparatus PF12 thereof) (step S1409).

In the transmission of step S1409, information (number) indicating the communication carrier of the source network N11 is attached to the data and transmitted.

The second provider P12 (the communication relay apparatus PF12 thereof) that has received the data (message) and the information (number) indicating the communication carrier of the source network N11 transmitted in step S1409 holds the information (number) in relation to the information (number) indicating the communication carrier of the source network N11 (step S1410).

Next, the second provider P12 (the communication relay apparatus PF12 thereof) issues a inquiry request to the destination network N13 (step S1411).

The inquiry request in step S1411 is performed by handling the transmission source (source network) N11 in the message transmission of step S1401 as the transmission source (source network).

The destination network N13 that has received the inquiry request of step S1401 executes interconnection determination of whether the connection between source network N11 and the destination network N13 is the connection satisfying a predetermined connection permission condition, such as the communication carriers of both networks having signed regular agreements (step S1412).

Regarding the interconnection determination of step S1412, in the procedure of steps S1101 to S1411, the information (number) indicating the communication carrier of the source network N11 that is the initial transmission source on the calling side is maintained as described. Therefore, the destination network N13 recognizes the maintained information (number) indicating the communication carrier of the source network N11 to accurately perform the interconnection determination.

In the example shown in FIG. 1 and FIG. 14, it is assumed that a positive determination result is obtained in the interconnection determination of step S1412 concerning whether the connection permission condition of interconnection of the communication service between the source network N11 and the destination network N13 is satisfied.

The positive determination result in the interconnection determination of step S1412 is returned to the second provider P12 (the communication relay apparatus PF12 thereof) as a location inquiry response (step S1413). In the location inquiry response of step S1413, the receiving subscriber is indicated by the IMSI of the destination network N13, and the destination network N13 is handled as the destination.

Another network N12 that has received the location inquiry response in step S1413 transmits the message to the destination network N13 (step S1413). In the transmission of message in step S1413, the receiving subscriber is indicated by the IMSI of the destination network N1, and the destination is the destination network N13.

Figure 15:
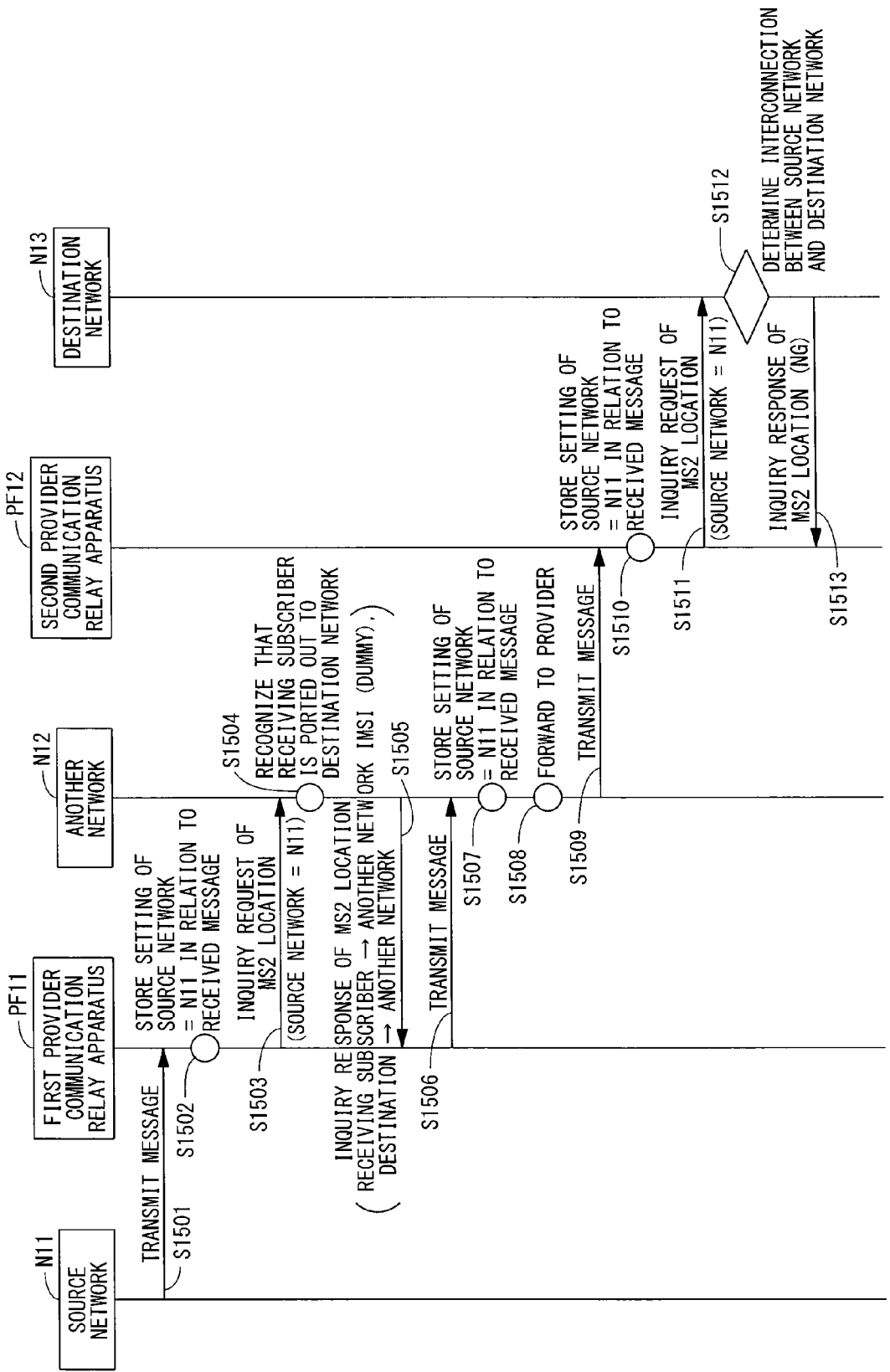
FIG. 15 is a sequence chart showing an operation of the communication service management system according to yet another aspect of the present invention.

FIG. 15 is a sequence chart indicating an operation of the communication service management system of yet another manner of the present invention.

FIG. 15 is a sequence chart showing an operation of the communication service management system, in a case where data (short message) is transmitted from the source network to the first provider communication relay apparatus PF11, while the same arrangement as in FIG. 5 is employed for the source network and the destination network as well as another network and the providers existing between the source network and the destination network.

In the example of FIG. 15 (see also FIG. 5), the data (short message in the case of short message service) subject to transmission is uniformly transmitted from the source network N11 to the first provider P11 (the communication relay apparatus PF11 thereof). Whether interconnection is permitted through a route of the communication relay apparatus PF11->another network N12->the second provider P12 (the communication relay apparatus PF12 thereof)->the destination network N13 is determined.

It is assumed that another network N12 and the destination network N13 have concluded a treaty of mutually carrying out the number portability. It is also assumed that the source network N11 and the destination network N13 have not signed carrier agreements for the connection of line.

Next, the communication service management system of the present invention will be described further with reference to FIG. 15 and FIG. 5.

The data (short message in the case of short message service) subject to transmission is uniformly transmitted from the source network N11 to the first provider P11 (the communication relay apparatus PF11 thereof) (step S1501).

In the transmission of step S1501, information (number) indicating the communication carrier of the source network N11 is attached to the data and transmitted.

The first provider P11 (the communication relay apparatus PF11 thereof) that has received the data (message) and the information (number) indicating the communication carrier of the source network N11 transmitted in step S1501 holds the information (number) in relation to the information (number) indicating the communication carrier of the source network N11 (step S1502).

The address information storage means included in the first provider P11 (the communication relay apparatus PF11 thereof) stores the information in step S1502.

Next, the first provider P11 (the communication relay apparatus PF11 thereof) handles N11 as the source network and issues a inquiry request to another network N12 (step S1503).

Another network N12 that has received the inquiry request in step S1503 recognizes that the receiving subscriber is ported out to the destination network N13 (step S1504).

Another network N12 that has recognized in step S1504 that the receiving subscriber is ported out to the destination network N13 makes a location inquiry response to the first provider P11 (the communication relay apparatus PF11 thereof) (step S1505). In the location inquiry response of step S1505, the receiving subscriber is indicated by a dummy IMSI in another network N12, and another network N12 is handled as the destination.

The first provider P11 (the communication relay apparatus PF11 thereof) that has received the location inquiry response of step S1505 transmits the message to another network N12 (step S1506).

Another network N12 that has received the message transmitted in step S1506 holds the information (number) in relation to the information (number) indicating the communication carrier of the source network N11 concerning the received message (step S1507).

Subsequent to step S1507, another network N12 makes an operation to forward the message received in step S1506 to the second provider P12 (the communication relay apparatus PF12 thereof) (step S1508).

Subsequent to step S1508, another network N12 transmits the message to the second provider P12 (the communication relay apparatus PF12 thereof) (step S1509).

The second provider P12 (the communication relay apparatus PF12 thereof) that has received the message in step S1509 maintains information indicative of the source network at N11 (step S1510).

Next, the second provider P12 (the communication relay apparatus PF12 thereof) issues a inquiry request to the destination network N13 (step S1511). The inquiry request in step S1511 is executed by maintaining the information indicative of the source network at N11.

The inquiry request in step S1511 includes a connection determination request for requesting the communication carrier of the destination network N13 to perform connection determination of whether the connection of the communication service satisfies a predetermined connection permission condition.

Therefore, the destination network N13 that has received the inquiry request of step S1511 is capable of accurately recognizing the communication carrier of the source network N11 from the maintained number.

Based on the recognition, the destination network N13 executes interconnection determination of whether the connection between the source network N11 and the destination network N13 is the connection satisfying a predetermined connection permission condition, such as the communication carriers of both networks having signed regular agreements (step S1512).

As described, under the conditions shown in FIG. 15 and FIG. 5, it is determined that the connection between the source network N11 and the destination network N13 is not permitted in the interconnection determination of step S1512.

Therefore, on the basis of the interconnection determination result, the destination network N13 returns a response of connection denial (NG) to the second provider P12 (the communication relay apparatus PF12 thereof) (step S1513).

As a result, substantial connection of the data (short message) originally subject to transmission is denied between the source network N11 and the destination network N13, which does not satisfy the requirement of connection, so the possibility of transmission or reception of an inappropriate message is prevented.

Next, an example of one of the methods for storing the address information in the communication relay apparatus in the examples described above will be described with reference to FIG. 16, FIG. 17, and FIG. 18. Means for executing the method is the address information storage means.

Figure 16:
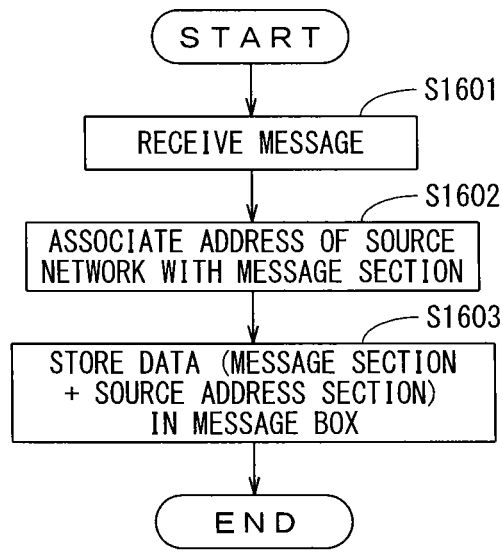
FIG. 16 is a flow chart showing a process during reception of data subject to transmission in a communication relay apparatus of the communication service management system of the present invention.

FIG. 16 is a flow chart showing a process during reception of data subject to transmission in the communication relay apparatus of another network, the provider, or the like that relays the transmission in the transmission of data from the source network N11 to the destination network N13.

Figure 17:
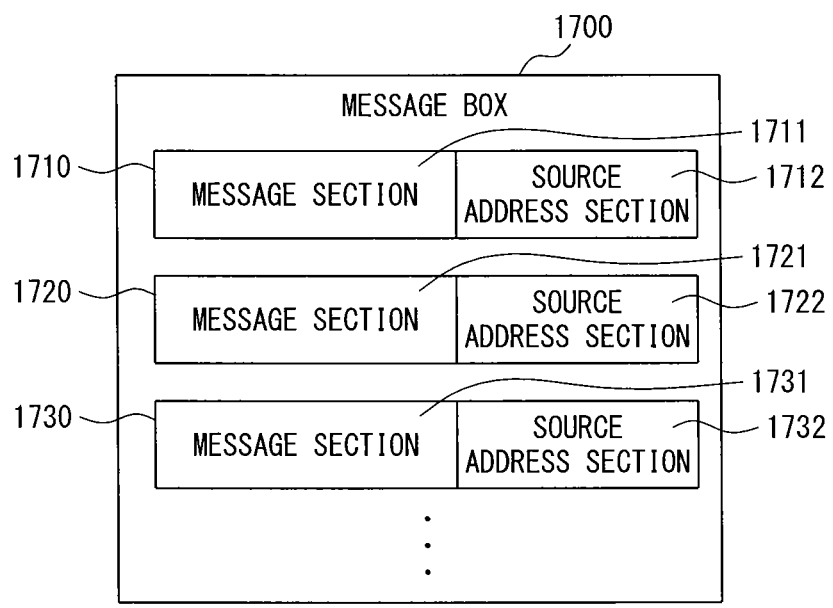
FIG. 17 is a conceptual diagram showing a manner of storing and holding the data subject to transmission in applied storage means in the process of FIG. 16.

FIG. 17 is a conceptual diagram showing a manner of storing and holding the data subject to transmission in applied storage means in the process of FIG. 16.

In FIG. 16, when the communication relay apparatus receives data subject to transmission including a message (step S1601), a source address as the address of the source network is associated with the message section of the data (step S1602).

Next, data in a format including a pair of the message section composed of the data indicating the message and the source address section composed of the source address associated with the data of the message section in step S1602 is stored in a message box of the applied storage means (step S1603).

The message box is a data storage area that is set to the storage means of the communication relay apparatus. As illustrated in FIG. 17, transmission data 1710, 1720, and 1730 are stored in a message box 1700 in such a manner that message sections 1711, 1721, and 1731 are combined with source address sections 1712, 1722, and 1732 to be respectively corresponding to each other in this order.

In the present example, it is recommended that the format of the message sections 1711, 1721, and 1731 be the same as an existing one from the viewpoint of securing the ease of implementation. The data of the message sections are associated with the source address data of the source address sections, and the source address data are stored without being changed, respectively.

Figure 18:
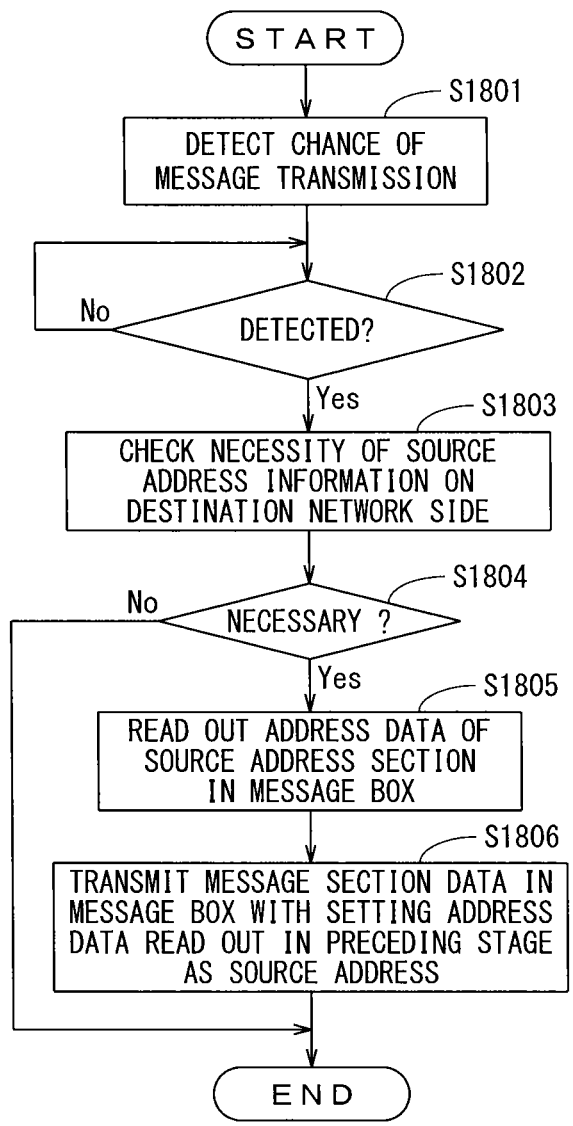
FIG. 18 is a flow chart showing a process when the communication relay apparatus of the communication service management system of the present invention transmits data, such as a message, subject to transmission.

FIG. 18 is a flow chart showing a process when the communication relay apparatus transmits data, such as a message, subject to transmission.

The communication relay apparatus waits for an arrival of a chance to transmit the data, such as a message, subject to transmission (step S1801->S1802: No).

When the arrival of the chance is detected (step S1802: Yes), the necessity of source address information in the destination network side is checked (step S1803). Regarding the connection contract, for example, the process of step S1803 is executed by making agreements between the carriers in relation to the necessity of the source address information on the destination network side, and by following the agreements.

Whether or not the processing result in step S1803 indicates that the information is necessary is determined (step S1804). When a result that the information of the source address is necessary on the destination network side is obtained (step S1804: Yes), the address data of the source address sections in the message box 1700 of FIG. 17 are read out (step S1805).

Next, the data of the message sections in the message box are transmitted to the destination network by handling the address data read out in step S1805 as the source addresses (step S1806).

On the other hand, when a result that the information of the source addresses is not necessary on the destination network side is obtained in step S1804 (step S1804: No), the process terminates.

Figure 19:
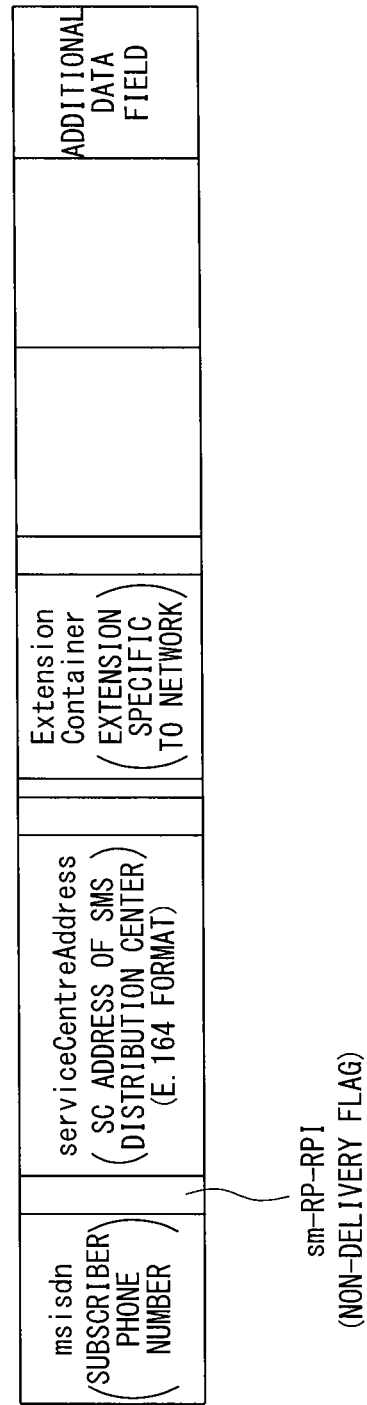
FIG. 19 is a diagram illustrating transmission frames of data subject to transmission in the communication service management system of the present invention.

FIG. 19 is a diagram illustrating transmission frames of data subject to transmission in the communication service management system according to an aspect of the present invention. In the description of FIG. 19, parts related to the embodiments of the present invention are mainly displayed in a simplified manner.

A data field "serviceCentreAddress" in FIG. 19 is a so-called SC address which is an address of a short message distribution center. A data field "extentionContainer" is an extension specific to the network.

In the present invention, an additional data field is arranged at the end as an aspect of the transmission frames of data subject to transmission. The source address data at the source address sections as described with reference to FIG. 17 are recorded and held in one of "serviceCentreAddress" and the additional data field.

Therefore, in relation to a communication service for transmitting data in the store-and-forward system to a receiving terminal device in a destination network, which is a network where the receiving terminal device is located, it is made possible to perform connection determination of whether the connection of the communication service satisfies a predetermined connection permission condition with accuracy.

Industrial Applicability

The present invention can be effectively used to realize a communication service management system, a short message service management system, a communication relay apparatus, a communication service management method, and a short message service management method capable of accurate connection determination of whether connection concerning a communication service satisfies a predetermined connection permission condition in relation to the communication service of transmitting data by a store-and-forward system from a calling terminal device in a source network, which is a network where the calling terminal device is located, to a receiving terminal device in a destination network, which is a network where the receiving terminal device is located, through one or a plurality of communication relay apparatuses of other networks and providers.

DESCRIPTION OF SYMBOLS

MS1 . . . calling terminal device
MS2 . . . receiving terminal device
N11 . . . source network
N12 . . . another network
N13 . . . destination network
P11 . . . first provider
P12 . . . second provider
P13 . . . third provider
PF11 . . . first provider communication relay apparatus
PF12 . . . second provider communication relay apparatus
PF13 . . . third provider communication relay apparatus

The invention claimed is:

1. A communication service management system carrying out a communication service for transmitting data in a store-and-forward system, the communication service management system comprising a communication relay apparatus, provided on a data transmission path from a source network where a calling terminal device is located to a destination network where a receiving terminal device is located, for relaying the data, the communication relay apparatus comprising:
  an address information receiving unit for receiving address information, of the source network where the calling terminal device is located, attached to the data to be relayed;
  an address information storage unit for storing the address information of the source network received by the address information receiving unit;
  a location inquiry request generating unit for adding the address information of the source network stored by the address information storage unit to generate a location inquiry request of requesting a location of the receiving terminal device;
  a location inquiry request transmitting unit for transmitting the location inquiry request generated by the location inquiry request generating unit to the destination network;
  a connection determination request unit for requesting a communication carrier of the destination network to perform connection determination on whether a connection of the communication service between the communication carrier of the destination network and a communication carrier of the source network satisfies a predetermined connection permission condition; and
  a connection control unit for controlling the communication service to be connected, when a result of the connection determination is positive, and when the receiving terminal device is located in the destination network;
  wherein the location inquiry request includes a request for maintaining information indicating the communication carrier of the source network without change, by prohibiting overwriting of the information indicating the communication carrier of the source network, and
  wherein the address information storage unit in the communication relay apparatus stores the data in a format including a pair of a message section composed of data indicating the data to be relayed and a source address section composed of a source network address indicating the source network and being associated with the data of the message section, in a message box of a storage.

2. The communication service management system according to claim 1, wherein a transmission frame including a data field including source network address data of the source address section is applied to the data transmission.

3. A short message service management system carrying out a short message service for transmitting a short message, the short message service management system comprising a communication relay apparatus, provided on a data transmission path from a source network where a calling terminal device is located to a destination network where a receiving terminal device is located, for relaying the short message, the communication relay apparatus comprising:
  an address information receiving unit for receiving address information, of the source network where the calling terminal is located, attached to the short message to be relayed;
  an address information storage unit for storing the address information of the source network received by the address information receiving unit;
  a location inquiry request generating unit for adding the address information of the source network stored by the address information storage unit to generate a location inquiry request of requesting a location of the receiving terminal device;
  a location inquiry request transmitting unit for transmitting the location inquiry request generated by the location inquiry request generating unit to the destination network;
  a connection determination request unit for requesting a communication carrier of the destination network to perform connection determination on whether a connection of the communication service between the communication carrier of the destination network and a communication carrier of the source network satisfies a predetermined connection permission condition; and
  a connection control unit for controlling the communication service to be connected, when a result of the connection determination is positive, and when the receiving terminal device is located in the destination network,
  wherein the location inquiry request includes a request for maintaining information indicating the communication carrier of the source network without change, by prohibiting overwriting of the information indicating the communication carrier of the source network, and the address information storage unit stores the information indicating the communication carrier of the source network,
  wherein the address information storage unit in the communication relay apparatus executes a process of storing data in a format including a pair of a message section composed of data indicating the short message to be relayed and a source address section composed of addresses indicating the source network associated with the data of the message section, in a message box of a storage.

4. The short message service management system according to claim 3, wherein a transmission frame including a data field including address data of the source address section is applied to the transmission of the short message.

5. A communication relay apparatus applied to a communication service management system carrying out a communication service for transmitting data in a store-and-forward system, the communication relay apparatus comprising:
  an address information receiving unit for receiving address information, of a source network where a calling terminal device is located, attached to the data to be relayed;
  an address information storage unit for storing the address information of the source network received by the address information receiving unit;
  a location inquiry request generating unit for adding the address information of the source network stored by the address information storage unit to generate a location inquiry request of requesting a location of the receiving terminal device;
  a location inquiry request transmitting unit for transmitting the location inquiry request generated by the location inquiry request generating unit to a destination network;
  a connection determination request unit for requesting a communication carrier of the destination network to perform connection determination on whether a connection of the communication service between the communication carrier of the destination network and a communication carrier of the source network satisfies a predetermined connection permission condition; and
  a connection control unit for controlling the communication service to be connected, when a result of the connection determination is positive, and when the receiving terminal device is located in the destination network, wherein the communication relay apparatus is provided on a data transmission path from the source network to the destination network for relaying the data, wherein the location inquiry request includes a request for maintaining information indicating the communication carrier of the source network without change, by prohibiting overwriting of the information indicating the communication carrier of the source network, and the address information storage unit stores the information indicating the communication carrier of the source network, and wherein the address information storage unit executes a process of storing data in a format including a pair of a message section composed of data indicating the data to be relayed and a source address section composed of an address indicating the source network associated with the data of the message section, in a message box of a storage.

6. The communication relay apparatus according to claim 5, wherein a transmission frame including a data field including address data of the source address section is applied to the data transmission.

7. A communication relay apparatus applied to a communication short message service management system carrying out a short message service for transmitting a short message, the communication relay apparatus comprising:

an address information receiving unit for receiving address information, of the source network where a calling terminal is located, attached to the short message to be relayed;

an address information storage unit for storing the address information of the source network received by the address information receiving unit;

a location inquiry request generating unit for adding the address information of the source network stored by the address information storage unit to generate a location inquiry request of requesting a location of the receiving terminal device;

a location inquiry request transmitting unit for transmitting the location inquiry request generated by the location inquiry request generating unit to a destination network;

a connection determination request unit for requesting a communication carrier of the destination network to perform connection determination on whether a connection of the communication service between the communication carrier of the destination network and a communication carrier of the source network satisfies a predetermined connection permission condition; and a connection control unit for controlling the communication service to be connected, when a result of the connection determination is positive, and when the receiving terminal device is located in the destination network, wherein the communication relay apparatus is provided on a data transmission path from the source network to the destination network for relaying the short message, wherein the location inquiry request includes a request for maintaining information indicating the communication carrier of the source network without change, by prohibiting overwriting of the information indicating the communication carrier of the source network, and the address information storage unit stores the information indicating the communication carrier of the source network, and wherein the address information storage unit executes a process of storing data in a format including a pair of a message section composed of data indicating the short message to be relayed and a source address section composed of an address indicating the source network associated with the data of the message sections, in a message box of a storage.

8. The communication relay apparatus according to claim 7, wherein a transmission frame including a data field including address data of the source address section is applied to the transmission of the short message.

9. A communication service management method carrying out a communication service for transmitting data in a store-and-forward system, the communication service management method comprising:

receiving address information, of a source network where a calling terminal device is located, attached to the data to be relayed;

storing the address information of the source network received by the received step;

adding the address information of the source network stored by the storing step to generate a location inquiry request of requesting a location of the receiving terminal device;

transmitting the location inquiry request generated to a destination network where a receiving terminal device is located;

requesting a communication carrier of the destination network to perform connection determination on whether a connection of the communication service between the communication carrier of the destination network and a communication carrier of the source network satisfies a predetermined connection permission condition; and controlling the communication service to be connected, when a result of the connection determination is positive, and when the receiving terminal device is located in the destination network, wherein the communication service management method is performed by a communication relay apparatus provided on a data transmission path from the source network to the destination network for relaying the data, wherein the location inquiry request includes a request for maintaining information indicating the communication carrier of the source network without change, by prohibiting overwriting of the information indicating the communication carrier of the source network, and the storing step stores the information indicating the communication carrier of the source network, and wherein in case that the address information is stored, executing a process of storing data in a format including a pair of a message section composed of data indicating the data to be relayed and a source address section composed of an address indicating the source network associated with the data of the message section, in a message box of a storage.

10. The communication service management method according to claim 9, wherein a transmission frame including a data field including address data of the source address section is applied to the data transmission.

11. A short message service management method of carrying out a short message service for transmitting a short message, the short message service management method comprising:

receiving address information, of a source network where a calling terminal device is located, attached to the short message to be relayed;

storing the address information of the source network received by the receiving step;

adding the address information of the source network stored by the storing step to generate a location inquiry request of requesting a location of the receiving terminal device;

transmitting the location inquiry request generated to a destination network where a receiving terminal device is located;

requesting a communication carrier of the destination network to perform connection determination on whether a connection of the communication service between the communication carrier of the destination network and a communication carrier of the source network satisfies a predetermined connection permission condition; and controlling the communication service to be connected, when a result of the connection determination is positive, and when the receiving terminal device is located in the destination network, wherein the communication service management method is performed by a communication relay apparatus provided on a data transmission path from the source network to the destination network for relaying the short message, wherein the location inquiry request includes a request for maintaining information indicating the communication carrier of the source network without change, by prohibiting overwriting of the information indicating the communication carrier of the source network, and storing the address information includes storing the information indicating the communication carrier of the source network, and wherein in case that the address information is stored, executing a process of storing data in a format including a pair of a message section composed of data indicating the short message to be relayed and a source address section composed of an address indicating the source network associated with the data of the message section, in a message box of a storage.

12. The short message service management method according to claim 11, wherein a transmission frame including a data field including address data of the source address section is applied to the transmission of the short message.

* * * * *